US012647224B2

(12) United States Patent (10) Patent No.: US 12,647,224 B2
Berg et al. (45) Date of Patent: Jun. 2, 2026

(54) SHARED-CELL TRANSMIT/RECEIVE POINT SELECTION AND COMBINING

(71) Applicant: Telefonaktiebolaget LM Ericsson (PUBL), Stockholm (SE)

(72) Inventors: Miguel Berg, Sollentuna (SE); Chenguang Lu, Sollentuna (SE); Björn Pohlman, Järfälla (SE); Gunther Auer, Gothenburg (SE); Ahsan Mahmood, Sundbyberg (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 970 days.

(21) Appl. No.: 17/780,888

(22) PCT Filed: Dec. 1, 2020

(86) PCT No.: PCT/SE2020/051156

§ 371 (c)(1),
(2) Date: May 27, 2022

(87) PCT Pub. No.: WO2021/112747

PCT Pub. Date: Jun. 10, 2021

(65) Prior Publication Data

US 2023/0014537 A1 Jan. 19, 2023

Related U.S. Application Data

(60) Provisional application No. 62/950,506, filed on Dec. 19, 2019, provisional application No. 62/942,185, filed on Dec. 1, 2019.

(51) Int. Cl.
*H04L 5/00* (2006.01)
(52) U.S. Cl.
CPC .......... *H04L 5/0035* (2013.01); *H04L 5/0051* (2013.01)

(58) Field of Classification Search
CPC ..... H04L 5/0035; H04L 5/0051; H04L 5/003; H04L 5/0058; H04B 7/024
See application file for complete search history.

(56) References Cited

U.S. PATENT DOCUMENTS

2013/0303167 A1 11/2013 Zhu et al.
2015/0131604 A1 5/2015 Hammarwall
(Continued)

FOREIGN PATENT DOCUMENTS

JP 2019-012937 A2 1/2019
JP 2022-553032 A2 12/2022
(Continued)

OTHER PUBLICATIONS

Umesh, Anil. "Standardization trends towards enabling radio access networks to be open and intelligent." NTT Docomo Technical Journal, The Telecommunications Association (TTA), vol. 27, No. 1, Apr. 23, 2019, pp. 43-55.
(Continued)

*Primary Examiner* — Ian N Moore
*Assistant Examiner* — Latresa A McCallum
(74) *Attorney, Agent, or Firm* — Baker Botts L.L.P.

(57) ABSTRACT

A method by performed by a network node operating as a Distributed Unit (DU) includes configuring a plurality of Transmit/Receive Points (TRPs) in a group of TRPs to transmit a plurality of signals in a multiplexed sequence to at least one wireless device. Each TRP in the group of TRPS is associated with a shared cell. The network node receives, from the at least one wireless device, a response signal. Based on the response signal, the network node determines at least one TRP from the group of TRPs for use in transmitting at least one additional signal to the at least one wireless device.

24 Claims, 13 Drawing Sheets

(56) References Cited

U.S. PATENT DOCUMENTS

| | | | |
|---|---|---|---|
| 2016/0323696 A1 | 11/2016 | Moulsley | |
| 2018/0092129 A1 | 3/2018 | Guo et al. | |
| 2019/0200237 A1 | 6/2019 | Futaki | |
| 2019/0229852 A1 | 7/2019 | Li et al. | |
| 2019/0246321 A1 | 8/2019 | Li et al. | |
| 2019/0261278 A1 | 8/2019 | Piyush et al. | |
| 2019/0335399 A1* | 10/2019 | Wang | H04B 7/0426 |
| 2019/0379506 A1* | 12/2019 | Cheng | H04W 88/06 |
| 2020/0045700 A1* | 2/2020 | Sun | H04L 5/0091 |
| 2020/0186304 A1 | 6/2020 | Khoshnevisan et al. | |
| 2020/0195397 A1* | 6/2020 | John Wilson | H04W 28/0231 |
| 2020/0228267 A1 | 7/2020 | Park et al. | |
| 2020/0245372 A1* | 7/2020 | Lei | H04W 74/0833 |
| 2021/0058925 A1* | 2/2021 | Shim | H04L 5/0053 |
| 2022/0271888 A1 | 8/2022 | Cha et al. | |
| 2023/0014537 A1 | 1/2023 | Berg et al. | |
| 2024/0322894 A1* | 9/2024 | Yuan | H04B 7/088 |

FOREIGN PATENT DOCUMENTS

| | | | | |
|---|---|---|---|---|
| WO | 2016 128023 A1 | 8/2016 | | |
| WO | WO-2018085374 A1 * | 5/2018 | | H04W 48/12 |
| WO | WO2018174609 A2 | 9/2018 | | |
| WO | WO-2019051177 A1 * | 3/2019 | | H04B 7/0602 |
| WO | WO-2019112496 A1 * | 6/2019 | | H04B 7/024 |
| WO | WO2019140389 A1 | 7/2019 | | |
| WO | WO-2021033883 A1 * | 2/2021 | | H04B 7/0413 |

OTHER PUBLICATIONS

Notice of Reasons for Rejection issued for Japanese Patent Application Serial No. 2023-172285—Dec. 10, 2024 (translation only).

3GPP TSG RAN WG1 Meeting #91; Reno, Nevada, US; Dec. 1-27, 2017; Agenda Item: 7.1.6; Source: Ericsson; Title: Synchronization using non-cell-defining signals (R1-1720944) (revision of R1-1717761).

3GPP TSG RAN WG3 Meeting #98; Reno, NV, USA; Agenda Item: 10.10.2.1; Source: KT Corp.; Title: Considerations for F1 Setup Procedure (R3-174854).

Notice of Reasons for Rejection issued for Japanese Patent Application No. 2022-530869—Jul. 4, 2023.

Marco Giordani et al., A Tutorial on Beam Management for 3GPP NR at mmWave Frequencies—Nov. 4, 2019.

ORAN-WG4.CUS.0-v02.00; Technical Specification; O-RAN Fronthaul Working Group Control, User and Synchronization Plane Specification—2019.

ORAN-WG4.MP.0-v02.00.00, Technical Specification; O-RAN Alliance Working Group 4, Management Plane Specification—2019.

3GPP TSG RAN WG1 Meeting #86bis; Lisbon, Portugal; Source: CMCC; Title: On multi-beam-based mobility management (R1-1609310)—Oct. 10-14, 2016.

PCT International Search Report issued for International application No. PCT/SE2020/051156—Feb. 26, 2021.

PCT Written Opinion of the International Searching Authority issued for International application No. PCT/SE2020/051156—Feb. 26, 2021.

Osama Al-Saadeh et al., 5G Ultra-Reliable Low-Latency Communication for Factory Automation at Millimetre Wave Bands—2019.

ETSI TR 138 901 v14.0.0; Technical Report; 5G; Study on channel model for frequencies from 0.5 to 100 GHz (3GPP TR 38.901 version 14.0.0 Release 14)—May 2017.

3GPP TSG RAN WG1 Meeting #66; Athens, Greece; Source: Alcatel-Lucent Shanghai Bell, Alcatel-Lucent; Title: COMP Phase 2 Evaluation for Scenario 3: FDD Downlink (R1-112793)—Aug. 22-26, 2011.

PCT International Search Report issued for International application No. PCT/IB2020/061325—Feb. 24, 2021.

EPO Communication pursuant to Article 94(3) EPC issued for Application No. 20 820 555.9-1206—Sep. 30, 2024.

3GPP TSG-RAN WG4 Meeting #93; Reno, NV, USA, Nov. 18-22, 2019; Agenda Item: 9.17.2.2.1; Source: Ericsson; Title: Transmission scheme in NR PDSCH demodulation requirements for HST (R4-1914346).

Non-Final Office Action issued by the USPTO for U.S. Appl. No. 17/778,894—Sep. 4, 2024.

Extended European Search Report issued for Application No./ Patent No. 24159762.4-1206 / 4351074—Apr. 18, 2024.

Office Action issued by the USPTO for U.S. Appl. No. 17/778,894—May 19, 2025.

* cited by examiner

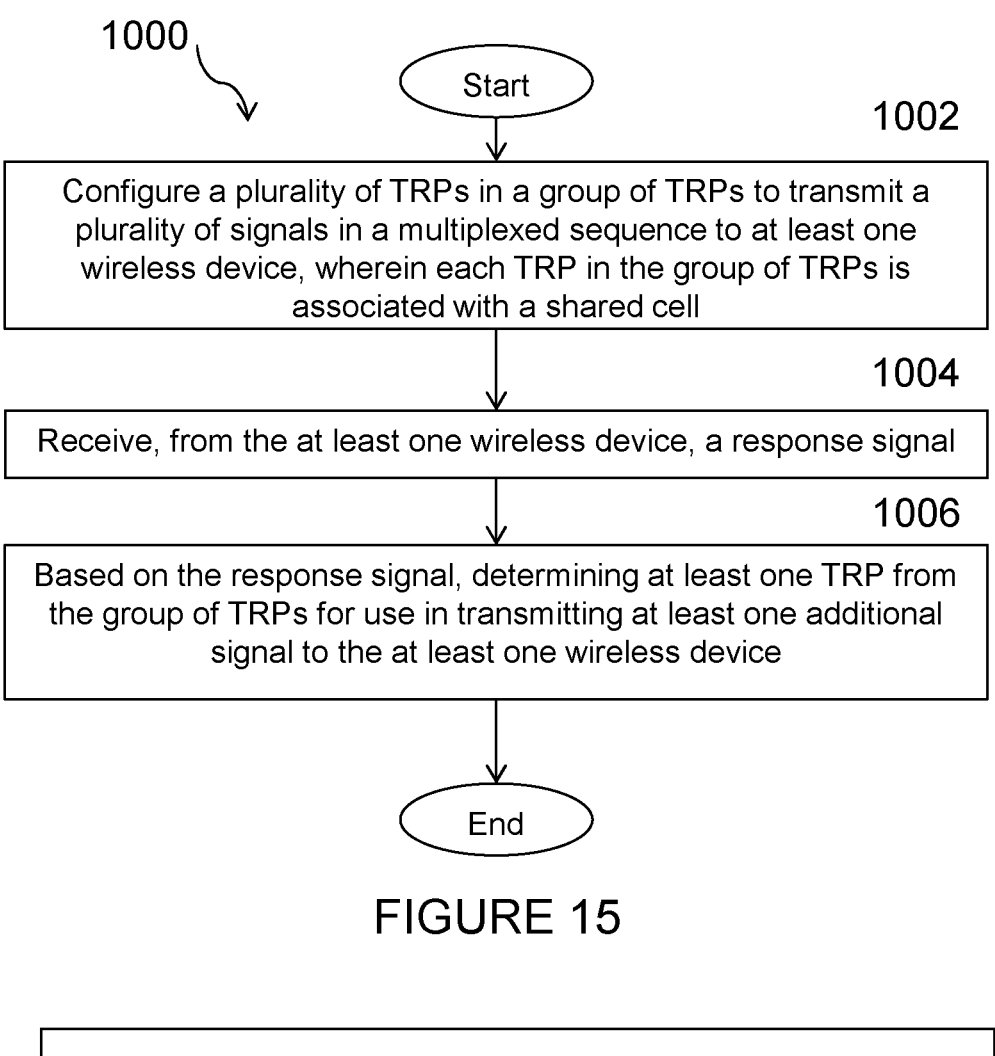

1000

Start

1002

Configure a plurality of TRPs in a group of TRPs to transmit a plurality of signals in a multiplexed sequence to at least one wireless device, wherein each TRP in the group of TRPs is associated with a shared cell

1004

Receive, from the at least one wireless device, a response signal

1006

Based on the response signal, determining at least one TRP from the group of TRPs for use in transmitting at least one additional signal to the at least one wireless device End

FIGURE 15

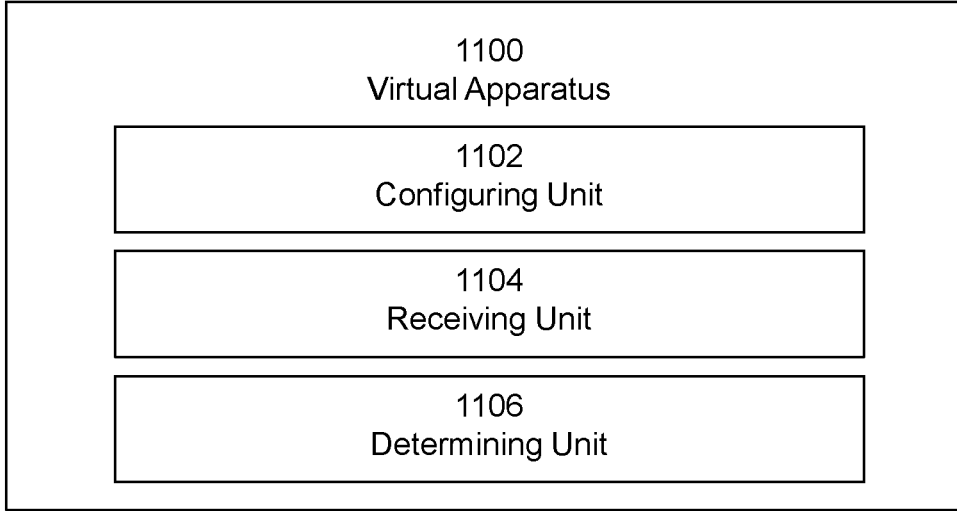

1100
Virtual Apparatus

1102
Configuring Unit

1104
Receiving Unit

1106
Determining Unit

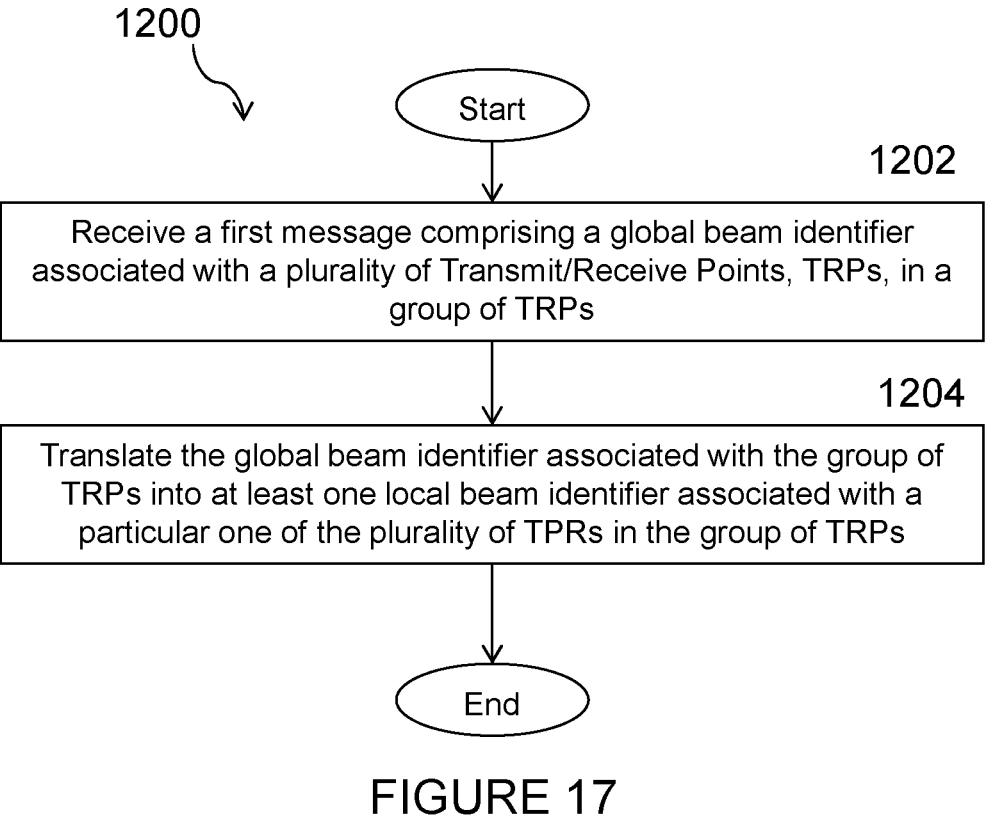

```
        ( Start )
             |
             v
```

1202

Receive a first message comprising a global beam identifier associated with a plurality of Transmit/Receive Points, TRPs, in a group of TRPs

1204

Translate the global beam identifier associated with the group of TRPs into at least one local beam identifier associated with a particular one of the plurality of TPRs in the group of TRPs

```
             |
             v
        (  End  )
```

FIGURE 17

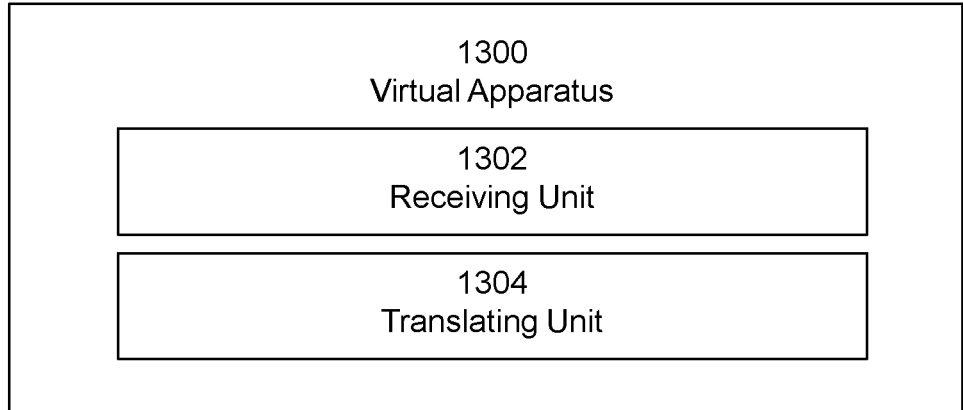

1300
Virtual Apparatus

1302
Receiving Unit

1304
Translating Unit

FIGURE 18

SHARED-CELL TRANSMIT/RECEIVE POINT SELECTION AND COMBINING

PRIORITY

This nonprovisional application is a U.S. National Stage Filing under 35 U.S.C. § 371 of International Patent Application Serial No. PCT/SE2020/051156 filed Dec. 1, 2020 and entitled "Shared-Cell Transmit/Receive Point Selection and Combining" which claims priority to U.S. Provisional Patent Application No. 62/942,185 filed Dec. 1, 2019 and to U.S. Provisional Patent Application No. 62/950,506 filed Dec. 19, 2019 all of which are hereby incorporated by reference in their entirety.

TECHNICAL FIELD

The present disclosure relates, in general, to wireless communications and, more particularly, systems and methods for shared cell Transmit/Receive Point (TRP) selection and combining.

BACKGROUND

In 3GPP 5G NR, the base station is denoted as a gNodeB (gNB). This is a logical entity that can be split into multiple distributed parts: Central Unit (CU) with packet processing, Distributed Unit (DU) with baseband processing, and Radio Unit (RU). In O-RAN, these entities are known as O-CU, O-DU, and O-RU respectively. See, O-RAN Fronthaul Working Group, "Control, User and Synchronization Plane Specification", O-RAN-WG4.CUS.0-v02.00, Jul. 2, 2019. See also, https://222.o-ran.org/.

In cellular systems such as 4G and 5G, it may be desired to reduce the number of cells covering an area. For example, it may be desirable to reduce the number of cells to reduce the number of handovers and/or to reduce cost of deployment. Fewer cells can be achieved by forming a single cell out of multiple radio units (RU, O-RU) or radio heads (RH) or Transmit/Receive Points (TRPs). A cell is identified by the Physical Cell Id (PCI), and if the RUs transmit the same PCI, then the user equipment (UE) sees them as a single cell and can move between them without performing higher-layer control signaling. This can be called e.g. "Combined Cell". However, previous Combined Cell techniques and systems require individual fronthaul resources for each RU, as well as separate uplink baseband-processing for each RU.

Cost of deployment (and also operation) for the combined cell can be reduced if at least some of the baseband processing resources and/or fronthaul network resources are shared. One example is in a single-frequency network (SFN) where all RUs transmit the same signal, and the downlink signal splitting is implemented digitally by copying samples. In uplink, signals can be combined non-coherently by addition before baseband processing, which means that the complexity is reduced (compared with the case where each RU had separate baseband processing). Further, fronthaul resources can be shared for the whole cell.

In O-RAN Working Group 4, which defines an Open Fronthaul Interface, such splitting and combining is part of the ongoing "Shared Cell" work item. See, O-RAN Fronthaul Working Group, "Control, User and Synchronization Plane Specification", O-RAN-WG4.CUS.0-v02.00, Jul. 2, 2019. See also, O-RAN Alliance Working Group 4, "Management Plane Specification", ORAN-WG4.MP.0-v02.00.00, Jul. 3, 2019.

Combining and splitting can be done in a so called Fronthaul Multiplexer (FHM) with O-RUs connected in a star topology or done in an O-RU in a chain of cascaded O-RUs. FIG. 1 illustrates an example topology that includes both a FHM and cascading O-RUs. More specifically, FIG. 1 shows some O-RUs in a star topology, as well as cascaded O-RUs where some are connected to the FHM and some to the O-DU. All O-RUs in the topology do not have to belong to the same cell (shared or not).

Shared Cell could be beneficial e.g. in areas that do not have very high traffic load. Later, if needed, capacity can be upgraded by cell splitting (adding baseband and/or fronthaul resources) without the need for replacing RUs.

Similar combining and splitting are already done in, for example, indoor small-cell systems where a Hub or Indoor Radio Unit (IRU) is used, e.g. in Ericsson's Radio Dot System. One difference is that the fronthaul interface in O-RAN WG4 transports frequency-domain IQ samples, while most currently deployed indoor small-cell systems transport time-domain IQ samples, e.g. using Common Public Radio Interface (CPRI).

Certain problems exist. For example, one problem is that all TRPs in a shared cell will transmit and receive signals even if the UE is only within reach of one of them. This increases the inter-cell interference in downlink, which will degrade downlink performance, especially near edges of the shared cell. Uplink will also, to a larger extent, be degraded by intercell interference since the receivers of all RUs are active simultaneously and combined.

Another problem may be that power consumption of TRPs may be unnecessarily high in a shared cell since they transmit and receive even if there is no UE in their coverage area.

Still another problem may be that the simultaneous downlink transmission is non-coherent, which gives limited coverage improvement. Another problem is that the non-coherent combining of uplink signals will increase the noise figure, leading to reduced uplink coverage.

Yet another problem may be that performance of UE position location in a shared cell is degraded compared with individual cells since the shared-cell coverage area is larger and since it is in many cases not known which RU in the shared cell that serves the UE.

SUMMARY

Certain aspects of the present disclosure and their embodiments may provide solutions to these or other challenges. For example, according to certain embodiments, methods and systems are provided for utilizing 3GPP 5G NR beam-management functions, mainly intended for mmW, to treat a group of multiple Transmit/Receive Points (TRPs), as one or more "beams." This enables selection of TRP(s) that should be used for communication with a given user equipment (UE).

According to certain embodiments, a method by a network node operating as a Distributed Unit (DU) includes configuring a plurality of TRPs in a group of TRPs to transmit a plurality of signals in a multiplexed sequence to at least one wireless device. Each TRP in the group of TRPS is associated with a shared cell. The network node receives, from the at least one wireless device, a response signal. Based on the response signal, the network node determines at least one TRP from the group of TRPs for use in transmitting at least one additional signal to the at least one wireless device.

According to certain embodiments, a network node operating as a DU includes processing circuitry configured to configure a plurality of TRPs in a group of TRPs to transmit a plurality of signals in a multiplexed sequence to at least one wireless device. Each TRP in the group of TRPS is associated with a shared cell. The processing circuitry is configured to receive, from the at least one wireless device, a response signal. Based on the response signal, the processing circuitry is configured to determine at least one TRP from the group of TRPs for use in transmitting at least one additional signal to the at least one wireless device.

According to certain embodiments, a method by a first network node includes receiving a first message comprising a global beam identifier associated with a plurality of TRPs in a group of TRPs and translating the global beam identifier associated with the group of TRPs into at least one local beam identifier associated with a particular one of the plurality of TRPs in the group of TRPs.

According to certain embodiments, a first network node includes processing circuitry configured to receive a first message comprising a global beam identifier associated with a plurality of TRPs in a group of TRPs and translate the global beam identifier associated with the group of TRPs into at least one local beam identifier associated with a particular one of the plurality of TRPs in the group of TRPs.

Certain embodiments may provide one or more of the following technical advantages. For example, one technical advantage may be that certain embodiments reduce intercell interference, both for up and downlink, leading to improved throughput. As another example, a technical advantage may be that certain embodiments reduce uplink noise figure, leading to improved uplink coverage. As still another example, a technical advantage may be that certain embodiments result in reduced power consumption since unused transmitters and receivers can be disabled. As yet another example, a technical advantage may be that association of UEs to TRPs in a shared cell improves UE positioning methods. As still another example, a technical advantage may be that certain embodiments provide support for coherent distributed beamforming in uplink and downlink.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 15 illustrates an example method by a wireless device, according to certain embodiments;

FIG. 16 illustrates an exemplary virtual computing device, according to certain embodiments;

FIG. 17 illustrates an example method by a network node, according to certain embodiments; and FIG. 18 illustrates another exemplary virtual computing device, according to certain embodiments.

DETAILED DESCRIPTION

Figure 1:
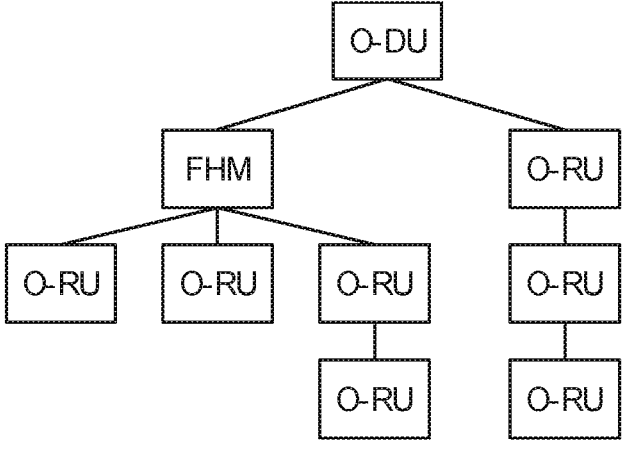
FIG. 1 illustrates an example topology that includes both a Fronthaul Multiplexer (FHM) and cascading O-RAN Radio Units (O-RUs)

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

Additionally, terminologies such as base station/gNodeB and UE should be considered non-limiting and do in particular not imply a certain hierarchical relation between the two; in general, "gNodeB" could be considered as device 1 and "UE" could be considered as device 2 and these two devices communicate with each other over some radio channel. And in the following the transmitter or receiver could be either gNB, or UE.3GPP 5GNR provides support for beamforming of Synchronization Signal Blocks (SSBs) using wide beams in order to improve coverage. The standard also supports beamforming of random access using the same type of beams. More advanced beamforming, with narrow beams, is supported for uplink and downlink channels such as Physical Uplink Shared Channel (PUSCH) and Physical Downlink Shared Channel (PDSCH). How to handle coarse and narrow beams is called beam management. See, M. Giordani, M. Polese, A. Roy, D. Castor, M. Zorzi, "A Tutorial on Beam Management for 3GPP NR at mmWave Frequencies," IEEE Communications Surveys & Tutorials, Volume 21, Issue 1, Q1 2019. Certain embodiments disclosed herein re-interpret the concept of beams and apply it to groups of Transmit/Receive Points (TRPs). This allows utilization of the 5GNR beam management functions to achieve several advantages.

Initial access in 5GNR starts with a transmission of the SSB. Multiple SS Blocks with different indices can be transmitted in a time-multiplexed sequence, using different downlink beams. This enables so called "beam sweeping" where the gNB sequentially transmits SSBs in different directions. Each SSB (in this case corresponding to a beam) is associated with a specific random-access resource (e.g. occasion and/or preamble sequence), which means that the gNB can correctly point beams towards any UEs that may send random access such as, for example, through Physical Random Access Channel PRACH. After receiving the PRACH in a specific beam, the gNB knows that the UE is reachable by that beam.

Figure 2:
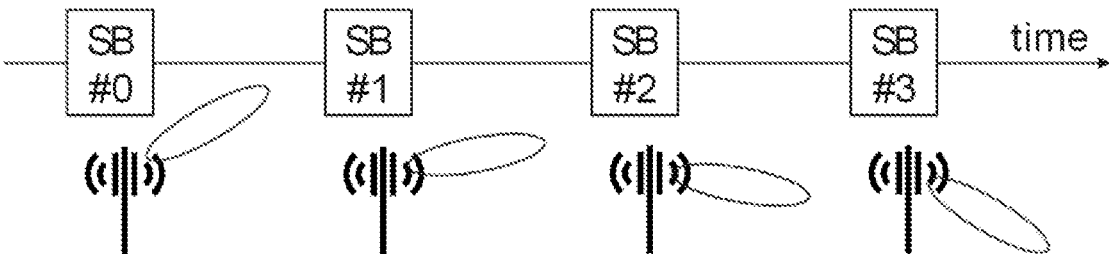
FIG. 2 illustrates systems and techniques for beam sweeping for Frequency Range 2 in, for example, millimeter-wave range.

Such beam sweeping is often used in conjunction with analog (or more generally, time-domain) beamforming for millimeter-wave communications. FIG. 2 illustrates systems and techniques for beam sweeping for Frequency Range 2 (FR2), i.e. millimeter-wave range. In FIG. 2, SB #n represents the SSB index during an SS Burst set. The RU transmits different coarse beams for each SB. A UE will select a suitable beam (RSRP above threshold, if possible). For each SB index, there is an associated PRACH resource to use by the UE.

Figure 3:
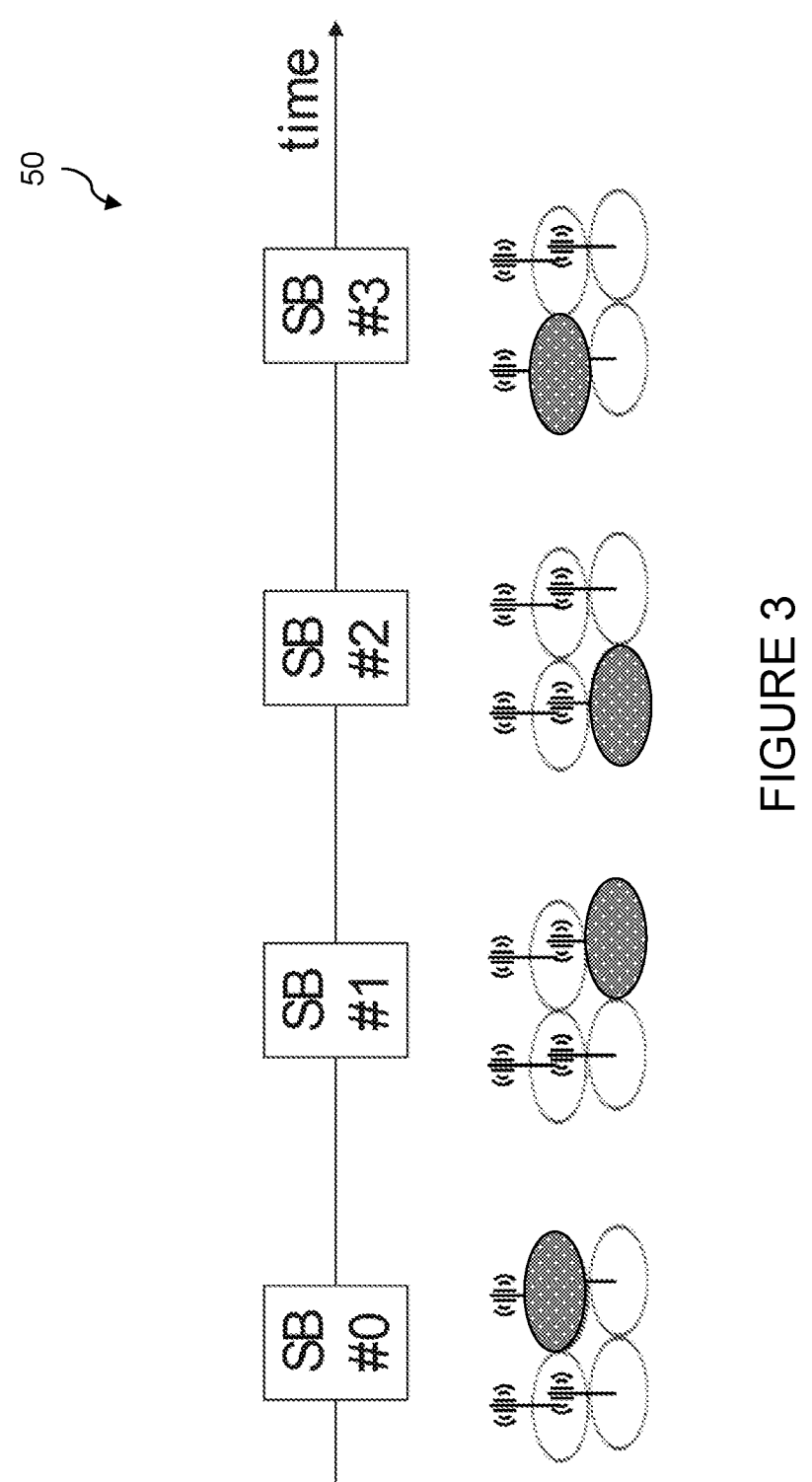
FIG. 3 illustrates "beam sweeping" where each Transmit/Receive Point (TRP) is assigned a "coarse beam" based on SSB index.

FIG. 3 illustrates a basic embodiment 50 of "beam sweeping" where each TRP, which may include a O-RAN Radio Unit (O-RU), is assigned a "coarse beam" based on SSB index, according to certain embodiments. In the illustrated embodiment, the beams are represented by different TRPs (or groups of TRPs) in a shared cell. Further refinement to a "fine beam" is in this case possible, if, for example, each TRP supports different beams. This is explained in more detail below. Note that, although not shown in FIG. 3, there could be a many-to-many mapping between SSB indices and TRPs (or groups of TRPs), in certain embodiments. By using the 3GPP beam management principles, a UE can be associated with a specific TRP even if multiple TRPs share baseband and/or fronthaul resources.

Beam management in 5G NR is typically divided into 3 procedures. As described below, the techniques disclosed herein are mapped to these three procedures, which may be referred to as P1-P3.

P1. Beam Establishment

Previous techniques include SSB beam sweep and access through PRACH. Specifically, different wide beams are used to transmit different SSB indices. The UE selects PRACH resource depending on the best SSB index, allowing the gNB to beamform also the PRACH using the same coarse beam as used for the corresponding SSB index. Such beam sweeping improves coverage since transmit and receive is focused compared with e.g. a fixed omnidirectional or three-sector antenna.

By contrast, according to certain embodiments disclosed herein, a "wide beam" ("coarse beam" in O-RAN) sweep is done by changing the group of TRPs that transmit and receive. Thus, a "coarse beam" may correspond to a group of TRPs (from a single TRP to the whole shared cell). A major difference from previous techniques is that in the embodiments described herein, "beamforming" may not necessarily improve coverage. Rather, the opposite, since a "beam" is a subset of the TRPs in the shared cell. Thus, the total power received by the UE may be lower than if no beamforming is needed. Instead, the main benefits are less interference and reduced power consumption. Of course, more advanced embodiments are possible, where multiple TRPs are active at the same time for a given UE such as, for example, by using coherent joint transmission and/or reception. Additionally, multiple "coarse beams" can be associated with a group of TRPs if needed such as, for example, to support different combinations of active TRPs, or to support per-TRP beamforming.

P2. gNB Beam Refinement and Tracking

Previous techniques include beam sweep using Channel State Information Reference Signals (CSI-RS) together with reporting from UE to find the best narrow beam(s). The UE uses a fixed receive beam to evaluate the different beams from the gNB. In the refinement procedure, measurements can be done either on SSB or CSI-RS. The UE reports so called Layer 1-Reference Signal Received Power (L1-RSRP) for up to 4 beams, indicating which reference signals that were measured and their Reference Signal Received Power (RSRP) level (absolute RSRP for the strongest beam and difference to the strongest for the other 3 beams). The gNB may then decide to adjust its beam based on the reporting. The adjusted beam does not have to correspond to one of the measured beams but can be a in a direction between the directions of some of the reported beams. In some cases, the beam selected for downlink can also be used for uplink. This is often the case such as, for example, for Time Division Duplexing (TDD) operation where the channel can be considered reciprocal if the UE velocity is not too high (channel coherence time vs TDD uplink (UL)/downlink (DL) period). For cases where the DL beam is not suitable for UL, a narrow UL beam can be determined based on Sounding Reference Signal (SRS) from the UE.

However, according to certain embodiments disclosed herein, a CSI-RS "beam sweep" is used to test "fine beams,"

which here corresponds to activating different TRPs in a group of TRPs sharing an SSB index, and/or to use different beams in each TRP. For example, if a "coarse beam" in P1 consists of a group of TRPs, CSI-RS can be used to split these groups into smaller TRP groups or even down to a subset of beams in a single TRP. Having the "fine beam" as a subset of beams in a single TRP could be useful such as, for example, when the coarse beam is a single TRP.

As in previous techniques, the UE may be ordered by the network to measure and report up to 4 different CSI-RS (or SSB) resources. For example, by assigning different SSB indices to groups of TRPs and transmitting these SSB indices time-multiplexed within a SS Burst set, it is possible to associate a UE with a group of TRPs, according to certain embodiments. According to certain embodiments, the UE will listen to different SSB indices and select a suitable SSB index based on RSRP (reference signal received power), and then chose the PRACH resource corresponding that SSB's index. When receiving the PRACH from the UE, the gNB knows which SSB "beam" (group of TRPs) that was selected by the UE. Depending on frequency range, there are maximum 4, 8, or 64 possible SSB positions (indices) during an SS burst set of 5 ms duration, in certain particular embodiments. The periodicity of the SS burst set is typically 20 ms but can be configured from 5 to 160 ms, in particular embodiments.

According to certain embodiments, a "narrow beam" ("fine beam" in O-RAN), which may include a smaller group of TRPs or even a single beam within a TRP, is possible using CSI-RS (Channel-State-Information Reference Signals). This can be useful e.g. for PUSCH and PDSCH channels.

Knowing more than one suitable "fine beam" for each UE improves flexibility. One example is when pairing users to be scheduled in the same 5G NR slot for a gNB with time-domain samples for user-plane data (such as Common Public Radio Interface (CPRI)). The gNB could, for example, decide to use the second or third best "fine beam" (e.g. TRP) for a UE that does not need all Physical Resource Blocks (PRBs), in order to be able to communicate with a second UE in the same slot. It could also decide to activate multiple "fine beams" for the same purpose if there is no "fine beam" that can reach both UEs. Thus, knowing more than one "fine beam" can mean less waste of valuable capacity (unless so called mini-slots are used, the same schedule usually applies for a whole slot).

If needed, in a particular embodiment, determining UL "fine beam" from SRS is possible if multiple SRS are scheduled and different SRS occasions from a single UE are received when different "fine beams" (TRPs) are active. In another particular embodiment, SRS may be treated separately. Thus, separate SRS may be sent from multiple "fine beams" over the fronthaul to the O-DU. The disadvantage is that this might increase fronthaul bitrate.

If each TRP has multiple antenna ports, CSI-RS can also be used to support these, e.g. for MIMO operation but this requires a different report than L1-RSRP and is thus not part of the beam refinement procedure. Multi-port CSI-RS may also be used to support distributed MIMO (D-MIMO) in the shared cell.

P3: UE Beam Refinement and Tracking

According to previous techniques, the UE evaluates different UE beams over multiple instances of the same SSB and/or CSI-RS, and/or Tracking Reference Signal (TRS). The UE assumes that the multiple instances of reference signals are sent using the same beam. The gNB will set a "repetition" flag for such resources, indicating that the same beam was used.

However, according to certain embodiments disclosed herein, the gNB may use the same group of TRPs and beams per TRP to send the different repetitions of each resource.

Certain embodiments may be applied for different functional split options. For a base-station functional split with time-domain IQ data, the fronthaul multiplexer or the TRPs in cascaded shared-cell can implement muting on OFDM symbol or slot level, for each spatial stream (e.g. MIMO layer). This is comparable to the restrictions imposed by time-domain (or analog) beamforming for mmWave RUs.

In a particular embodiment, for example, for a time-domain split (e.g. split option 8 from 3GPP TR 38.801 v14.0.0, like what is typically used in CPRI), assigning SSBs to TRPs can be done by, for example, muting all TRPs that are not assigned a specific SSB during the OFDM symbols when the particular SSB is transmitted. The restriction is that all users scheduled in one specific OFDM symbol must be in the coverage area of the selected "beam" (TRP, or group of TRPs).

For frequency domain (intra-PHY) splits (e.g. O-RAN WG4 "7-2x" or other variants of split option 7 from 3GPP TR 38.801 v14.0.0), muting is more flexible and can be done, for example, per OFDM symbol, per resource block (PRB), or even per resource element (RE), for each OFDM symbol and spatial stream. In O-RAN 7-2x lower layer split (LLS), it is suitable to do muting on section level. An O-RAN LLS section typically corresponds to a group of PRBs for one OFDM symbol and one spatial stream (e.g. one MIMO layer). This is comparable to the flexibility of frequency-domain beamforming in a mid-band AAS radio.

For splits further up in the protocol stack, e.g. option 6 (MAC-PHY), shared cell is not directly applicable but an intermediate node such as the FHM may convert to an intra-PHY split (option 7 variants) or a split below the PHY (option 8, having time-domain samples).

Scheduling information is sent in advance from the O-DU in a C-plane "section". The C-plane section specifies which PRBs will be used and it also gives a "beamId" that will control which beam to apply for the section (covering a set of PRBs/REs for one spatial stream). The beamId can either refer to a specific fixed-beam supported by an O-RU, or the interpretation of the beamId can be pre-configured via management plane (M-plane), or defined in control plane (C-plane) using a "section extension." Beams can be described in different ways such as, for example, using attributes such as beam width and pointing angle, or by a table of beam weights for all antenna ports. It is also possible to send channel information and let the O-RU calculate beam weights.

A later data section (U-plane) can refer to a particular C-plane message by including its SectionId. In the example shown, the data section is too long for the network's maximum transmission unit (e.g. Ethernet packet payload size) and, therefore, split into multiple U-plane messages with different values for the starting PRB number (startPrbu) and number of PRBs (numPrbu).

Controlling which O-RUs to Activate and how to Combine Multiple O-RUs

According to certain embodiments, specific methods are provided to control Shared-Cell TRP selection and combining. Example embodiments are given for O-RAN (Lower Layer Split, option 7-2x) where the TRPs correspond to O-RUs, and using C-plane parameter names from O-RAN (e.g. the C-plane parameter "beamId" to select beam for a group of PRBs in a spatial stream). However, the techniques described herein are not restricted to O-RAN and option 7-2x, similar implementations are possible for other splits. In case of other splits, the O-RU should be interpreted as a regular RU or any other TRP, and the O-DU as a regular DU etc.

The current assumption in O-RAN WG4 is that control and user plane (C-plane and U-plane) messages are common for all O-RUs in the shared cell while management plane (M-plane) can be used for individual O-RU configuration and parameter readout. See, O-RAN Fronthaul Working Group, "Control, User and Synchronization Plane Specification", O-RAN-WG4.CUS.0-v02.00, Jul. 2, 2019. See also, O-RAN Alliance Working Group 4, "Management Plane Specification", ORAN-WG4.MP.0-v02.00.00, Jul. 3, 2019. For beams where more than one O-RU is active, some type of uplink combining (e.g. addition) of signals is necessary. This can be performed e.g. in an FHM, or in O-RUs when cascading is used. For downlink, copying is necessary, possibly including multiplication with different weights for different O-RUs.

If each "coarse beam" equals a single O-RU, and if there is no need to have multiple "coarse beams" active for a single PRB (or RE) and spatial stream, then there is no need for addition of uplink signals. In that case, up- and downlink signals can be forwarded as is.

The following example embodiments are described in more detail in the following sections:

In a particular example embodiment, the O-DU sends the same beamId to different O-RUs but making sure that each O-RU makes a different interpretation of the beamIds. This can be based on actual beam weights (e.g. setting beam weight to zero for some beamId, which should not activate a certain O-RU), or on some other properties of beams (e.g. setting a special attribute such as zero be a width for non-wanted beams)

In another particular example embodiment, the O-DU sends the same beamId to different O-RUs but the beamIds are translated along the way (e.g. in an FHM, in a programmable packet switch, or in an O-RU)

In another particular example embodiment, implementation in O-DU (no change needed in O-RU) includes sending different beamIds to different O-RUs by direct addressing (e.g. Ethernet or IP). If only one O-RU is active for a given spatial stream and resource element, the FHM and the O-RU cascading can be implemented simply by packet switching or routing.

In another particular example embodiment, one or more new fields (e.g. may be added in a bit mask, list of O-RU IDs, or list of beamIds) in C-plane or U-plane and when necessary, a corresponding M-plane configuration how each O-RU should interpret the new field (e.g. which bit position it should monitor).

Different Interpretation of BeamId in Each O-RU

Which O-RU to activate in shared-cell O-RU selection can be controlled by clever utilization of the parameter "beamId" sent in a C-plane section together with scheduling information, before each DL or UL user plane (U-plane) data section. As described above, ensuring that different O-RUs have different understanding of each beamId may be done in different ways. In this section, a beamweight-based method is described. As described above, it is also possible to use attribute-based beamforming if a special attribute can be configured to mean that the beam is disabled (e.g. zero beamwidth).

In a particular embodiment, if the O-RU supports configurable beam weights via M-plane, the O-DU can set a non-zero beam-weight magnitude (e.g. 1.0 or a smaller number, possibly complex) for all beamIds that the O-RU should respond to, and zero magnitude (or a very small number) for the beams where the O-RU should be inactive. As an alternative to M-plane configuration, a new C-plane section type, or section extension type, is also possible, where weights are given for each O-RU in the shared cell. A further alternative is that an intermediate, node such as the FHM, modifies C-plane messages containing beam weights so that different O-RUs receive different beam weight configurations.

Table 1 shows an example of O-RU antenna-weight for O-RUs with single antenna-port. Here, O-RU1 and O-RU2 are in group 1 (one coarse beam with its own SSB index), while O-RU3 and O-RU4 are in group 2. O-RUs within each group are separated with CSI-RS to form fine beams. Stated differently, each "coarse beam" (from SSB beam sweeping) consists of two O-RUs and "fine beams" created by CSI-RS beam sweeping. Note that O-RU groups do not have to be the same size and that weights might be complex although not shown here.

TABLE 1

| beamId/O-RU | O-RU1 | O-RU2 | O-RU3 | O-RU4 | |
|---|---|---|---|---|---|
| 1 | 1.0 | 1.0 | 0.0 | 0.0 | Coarse beam 1A |
| 2 | 0.5 | 0.5 | 0.0 | 0.0 | Coarse beam 1B |
| 3 | 0.0 | 0.0 | 1.0 | 1.0 | Coarse beam 2A |
| 4 | 0.0 | 0.0 | 0.5 | 0.5 | Coarse beam 2B |
| 5 | 1.0 | 0.0 | 0.0 | 0.0 | Fine beam 1.1 |
| 6 | 0.0 | 1.0 | 0.0 | 0.0 | Fine beam 1.2 |
| 7 | 0.0 | 0.0 | 1.0 | 0.0 | Fine beam 2.1 |
| 8 | 0.0 | 0.0 | 0.0 | 1.0 | Fine beam 2.2 |

Two versions (A and B) are provided of each "coarse beam" in this example. The reason is if (for some reason) the gNB and/or UE expect that the fine beam should perform better (higher received power) than the "coarse beam". In that case, the initial "coarse beam" could use a lower weight per O-RU (version B) so that the fine beam does not perform worse. Of course, if this is a real problem, "coarse beam" 1A and 2A could be omitted from the table. Further, if desired, e.g. to shape the coverage area, different O-RUs active in a given beamId could have different weight.

If the O-RUs have multiple antenna ports, the same (or different) weights could be applied to the ports, and possibly multiplied with dynamic weights provided from baseband processing, e.g. for MIMO. It is also possible to create finer beams by utilizing the O-RU antennas. This can be implemented e.g. with more rows in the table, or by handling these finer beams dynamically in the baseband unit (O-DU) using multi-port CSI-RS.

According to certain embodiments, distributed beamforming (using multiple O-RUs) is possible and can be used to create fine beams. Table 2 is an example of O-RU antenna weight table for distributed beamforming in the invention. Here, O-RU1 and O-RU2 is coarse beam 1 while O-RU3 together with O-RU4 is coarse beam 2, and coarse beam 3 overlaps the other coarse beams partially. Fine beams are here used for distributed beamforming from the two O-RUs within each coarse beam.

TABLE 2

| beamId/O-RU | O-RU1 | O-RU2 | O-RU3 | O-RU4 | |
|---|---|---|---|---|---|
| 1 | 0.5 | 0.5 | 0.0 | 0.0 | Coarse beam 1 |

11

TABLE 2-continued

| beamId/O-RU | O-RU1 | O-RU2 | O-RU3 | O-RU4 | |
|---|---|---|---|---|---|
| 2 | 0.0 | 0.0 | 0.5 | 0.5 | Coarse beam 2 |
| 3 | 0.0 | 0.6 | 0.4 | 0.0 | Coarse beam 3 |
| 4 | $\sqrt{0.5}$ | $\sqrt{0.5}$ | 0.0 | 0.0 | Fine beam 1.1 |
| 5 | $\sqrt{0.5}$ | $-\sqrt{0.5}$ | 0.0 | 0.0 | Fine beam 1.2 |
| 6 | $\sqrt{0.5}$ | $i\sqrt{0.5}$ | 0.0 | 0.0 | Fine beam 1.3 |
| 7 | $\sqrt{0.5}$ | $-i\sqrt{0.5}$ | 0.0 | 0.0 | Fine beam 1.4 |
| 8 | 0.0 | 0.0 | $\sqrt{0.5}$ | $\sqrt{0.5}$ | Fine beam 2.1 |
| 9 | 0.0 | 0.0 | $\sqrt{0.5}$ | $-\sqrt{0.5}$ | Fine beam 2.2 |
| 10 | 0.0 | 0.0 | $\sqrt{0.5}$ | $i\sqrt{0.5}$ | Fine beam 2.3 |
| 11 | 0.0 | 0.0 | $\sqrt{0.5}$ | $-i\sqrt{0.5}$ | Fine beam 2.4 |
| 12 | 0.0 | $\sqrt{0.6}$ | $\sqrt{0.4}$ | 0.0 | Fine beam 3.1 |
| 13 | 0.0 | $\sqrt{0.6}$ | $-\sqrt{0.4}$ | 0.0 | Fine beam 3.2 |
| 14 | 0.0 | $\sqrt{0.6}$ | $i\sqrt{0.4}$ | 0.0 | Fine beam 3.3 |
| 15 | 0.0 | $\sqrt{0.6}$ | $-i\sqrt{0.4}$ | 0.0 | Fine beam 3.4 |
| . . . | | | | | |

Thus, Table 2 gives an example of a beam table where the coarse beams are partially overlapping and use non-coherent combining. Coarse beam 1 and 2 have the same weights for all O-RUs while coarse beam 3 has slightly different weights for the O-RUs, shaping the coverage area of the beam. The fine beams are designed to provide approximately coherent combining (distributed beamforming) of single-layer transmission/reception from either O-RU group 1 (beamId 4-7) or O-RU group 2 (beamId 8-11), or group 3 (beamId 12-15). In this example, four different fine beams are used for each coarse beam. The UE will measure the highest RSRP on the fine beam that yields closest to coherent addition between the signals from the O-RUs in the shared cell. It would also be possible to include beams supporting more simultaneous O-RUs, or even more simultaneous layers (distributed MIMO). It should be noted that the result of the distributed beamforming here is not a beam in the traditional sense but rather fractional-wavelength sized pockets in space where the signals from the O-RUs add coherently.

Using complex weights like in TABLE 2 makes most sense when the coherence bandwidth of the channel is larger (or at least not smaller) than the frequency-domain chunk of data that is controlled by the O-RU selection. For example, in a time-domain split, this might work e.g. for some indoor channels with very short delay spread where the coherence bandwidth is similar to, or larger than, the carrier bandwidth. For O-RAN LLS and similar frequency-domain splits, O-RU selection can be done per PRB or group of PRBs. In that case, distributed beamforming might work in a wide variety of channel conditions.

Translation of BeamId

According to certain embodiments, the O-DU sends the same beamId to all O-RUs (shared C-plane message) but beamIds are translated in some node. Depending on topology of the shared cell, the translation could be done either in the O-RU or in an FHM. The translation may also be performed by a programmable packet switch or router with deep packet processing capabilities, e.g. using the P4 programming language to modify the beamId field in the O-RAN (or other) header.

Translation of beamId is useful, for example, if the O-RUs only support fixed beams. Here, a new M-plane configuration is defined, describing a translation between the O-RU's internally supported beamIds and the shared cell's beamIds sent by the O-DU. This translation could be e.g. in the form of a configured range, a table, or a mathematical formula provided by the O-DU, in particular embodiments. One type of translation is to add/subtract an offset. For example, if each O-RU locally supports beamIDs 0-11, the shared-cell beamIds could be translated so that O-RU1 responds to beamId 0-11, O-RU2 to beamIds 12-23, O-RU3 to beamIds 24-35 etc. Overlapping beamId ranges is also possible if it is desired that multiple O-RUs should transmit/receive for certain beams.

In a particular embodiment, an O-RU may be silent in UL and DL if the shared-cell beamId is not within its own range. For cascaded O-RUs, at least part of the translation must be done in the O-RUs. Translation could be done completely by each O-RU. Another option when using offset-based translation is that the O-RU closest to the DU checks if any of the beams in the C-plane message applies to it, if not, it subtracts the number of local beamIds (12 in the example) and sends the C-plane message to the next O-RU, which does the same thing. If the resulting beamId is negative, the O-RU does not have to pass the C-plane message on.

If it is desired to support simultaneous transmission/reception on any combination of multiple O-RUs with different beamId, the translation could be to treat the global beamId like a base-N number where N is the number of beams supported per O-RU (local beams). For example, with 8 beams per O-RU, the shared-cell beamId could be formed by an octal number where each octal digit selects the beam in a particular O-RU, e.g. "13777". Here, at least one of the beamIds for each O-RU should be defined as no transmission and/or reception. With a 15-bit beamId and 8 beams per O-RU, a maximum of 5 O-RUs could be supported. If more O-RUs are supported in the shared cell, they could be grouped. Alternatively, one could reduce the number of beamIds supported per O-RU.

Other translations are also possible, e.g. based on enumeration of a subset of all possible combinations of beams. For example, all combinations of one and two active O-RUs Implementation in O-DU Using Individual Addressing of O-RUs According to certain embodiments, the shared cell feature could be completely implemented in the O-DU; the O-DU knows the shared-cell topology (from manual configuration, or from auto-discovery) and can address each O-RU by using, for example, Ethernet MAC addressing and/or IP addressing depending on the type of network. Such individual addressing is anyway needed in order to perform O-RU management (e.g. M-plane configuration and capability readout) in a shared cell. The same type of O-RU addressing can be used by the O-DU for "beam sweep" between O-RUs or groups of O-RUs.

In a particular embodiment, the O-DU treats each O-RU as one or more "coarse beams" and sends different SSB indices to different O-RUs, multiplexed in time (multiple SSB indices can be used for a single O-RU if needed). The effect is a kind of shared cell since only one O-RU will be active at the time for a given spatial stream and RE. Thus, C-plane and U-plane messages would no longer be shared, and the FHM could be an Ethernet switch (or perhaps an IP router). Also, cascading of O-RUs would only require Ethernet forwarding.

If each O-RU supports multiple beams, a fine beam sweep can be performed with CSI-RS once the "coarse beam" is known for a UE. Multi-port CSI-RS can be used to handle MIMO and transmit/receive diversity in the shared cell. New Information Fields in C-Plane and/or U-Plane to Control which O-RU Groups to Activate According to certain embodiments, one or more new information fields can be added in C-plane and/or U-plane in order to control which O-RU groups should be active for a given section. The new field(s) can be placed in a reserved field in an existing section type or section extension. Alternatively, a new section type or section extension can be defined for this purpose. A new M-plane configuration is used to tell each O-RU how to interpret the new field(s).

According to a particular embodiment, one alternative is to define a new bitmask (orugMask) in control plane (C-plane) or user plane (U-plane), where each position defines which O-RU group to activate. The M-plane configuration will tell each O-RU group which bit position(s) to monitor.

According to another particular embodiment, another alternative is to add a field containing a list of O-RU groups to activate. O-RU groups could be given an ID via M-plane configuration e.g. based on enumeration of O-RUs in conjunction with topology discovery, or an ID could be determined based on e.g. the Ethernet MAC or IP address.

According to still another particular embodiment, a further alternative is to have a new section type or section extension with a list of shared-cell beam IDs (scBeamId) where each scBeamId corresponds to a specific O-RU or group of O-RUs. In this case, the existing "beamId" parameter is not needed to select O-RU group and can be used to select beam within an O-RU like in prior-art O-RAN LLS. A new section extension could also define the scBeamIds for all O-RU groups such as, for example, by sending dynamically updated weights or beam attributes. If desired, it may be possible to use channel-information based beamforming, where the O-RU calculates its own beam weights. O-RUs that should not transmit can be given a very small (e.g. zero-value) channel estimate and/or a large regularization parameter compared with O-RUs that should transmit.

Further Features and Improvements

Certain embodiments described herein may support having different O-RUs active for different resource elements (REs) within the same PRB. This may be achieved e.g. by utilizing the resource element mask (reMask) feature in O-RAN LLS in combination with any of the methods described above. One use case could be for spectrum sharing between 4G LTE and 5G NR so that LTE is sent from one O-RU group and NR from another O-RU group.

Figure 4:
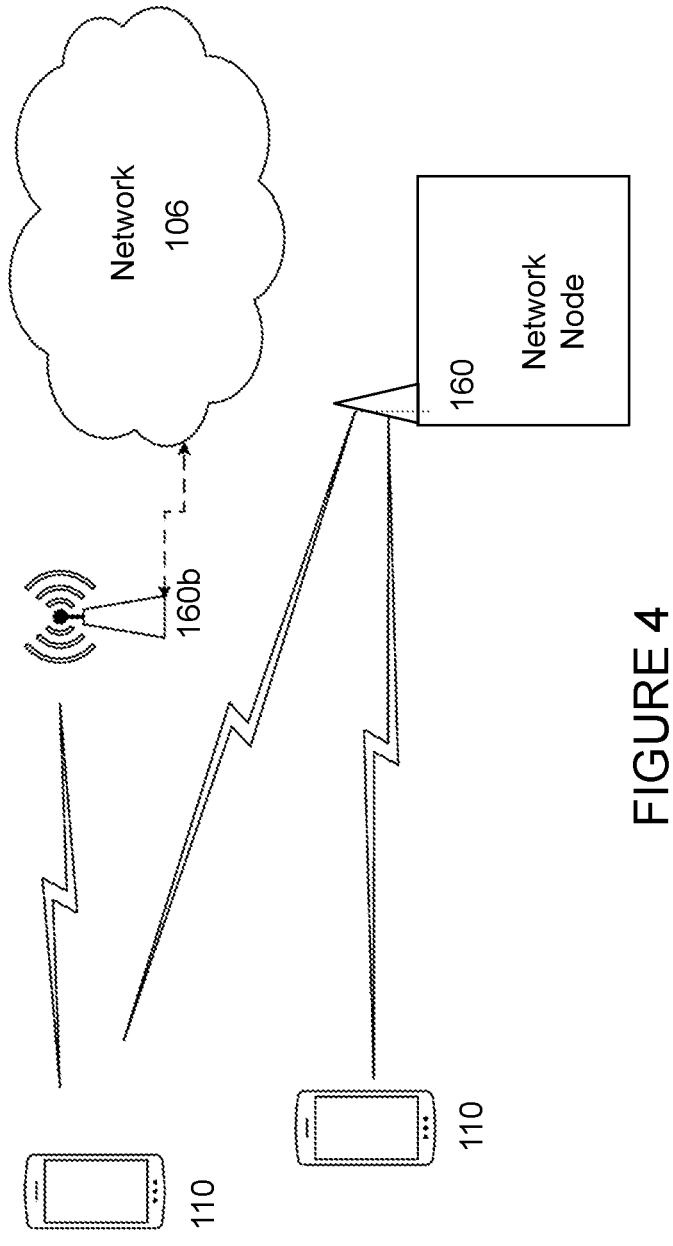
FIG. 4 illustrates an example wireless network, according to certain embodiments.

FIG. 4 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 5:
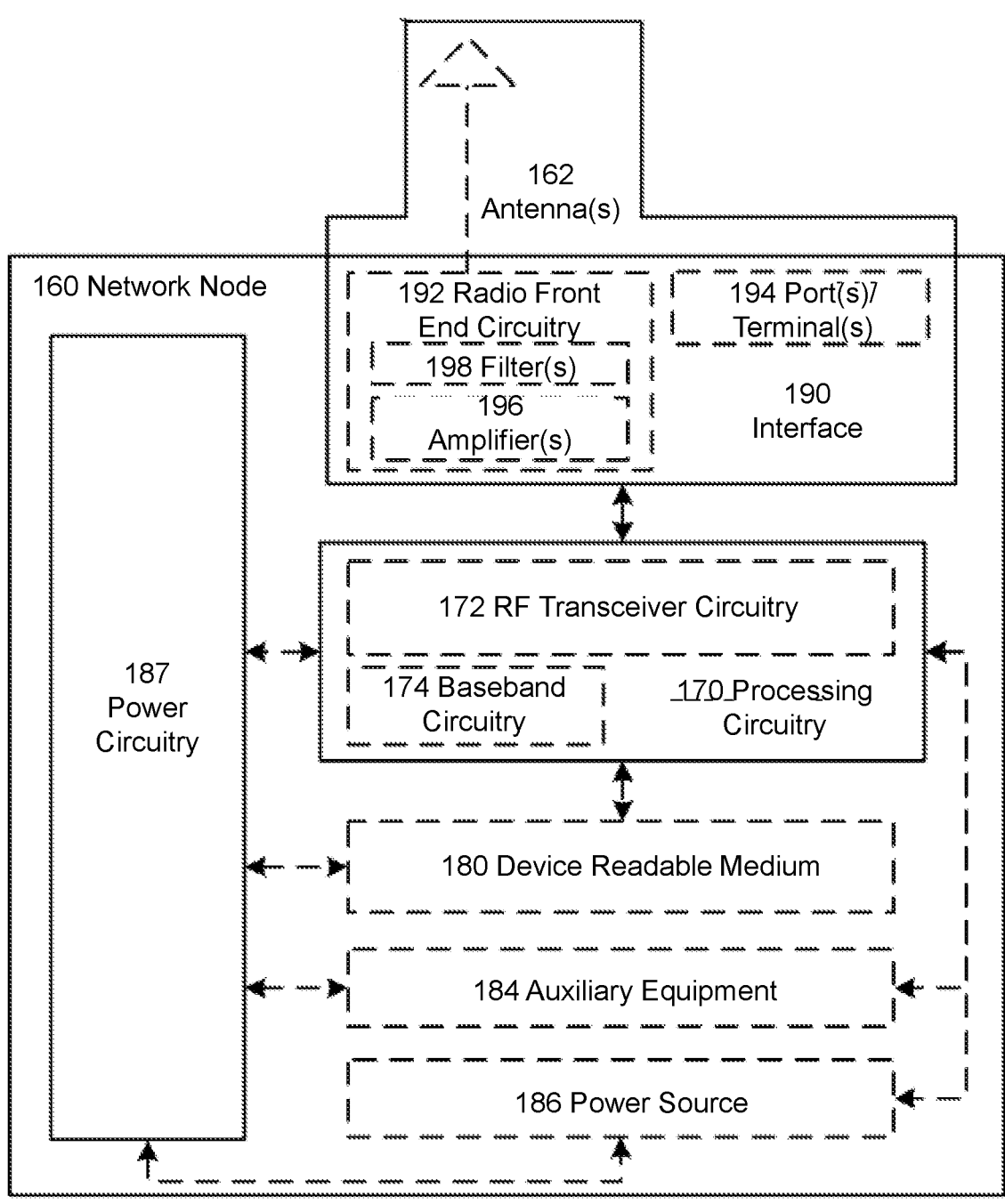
FIG. 5 illustrates an example network node, according to certain embodiments.

FIG. 5 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 6:
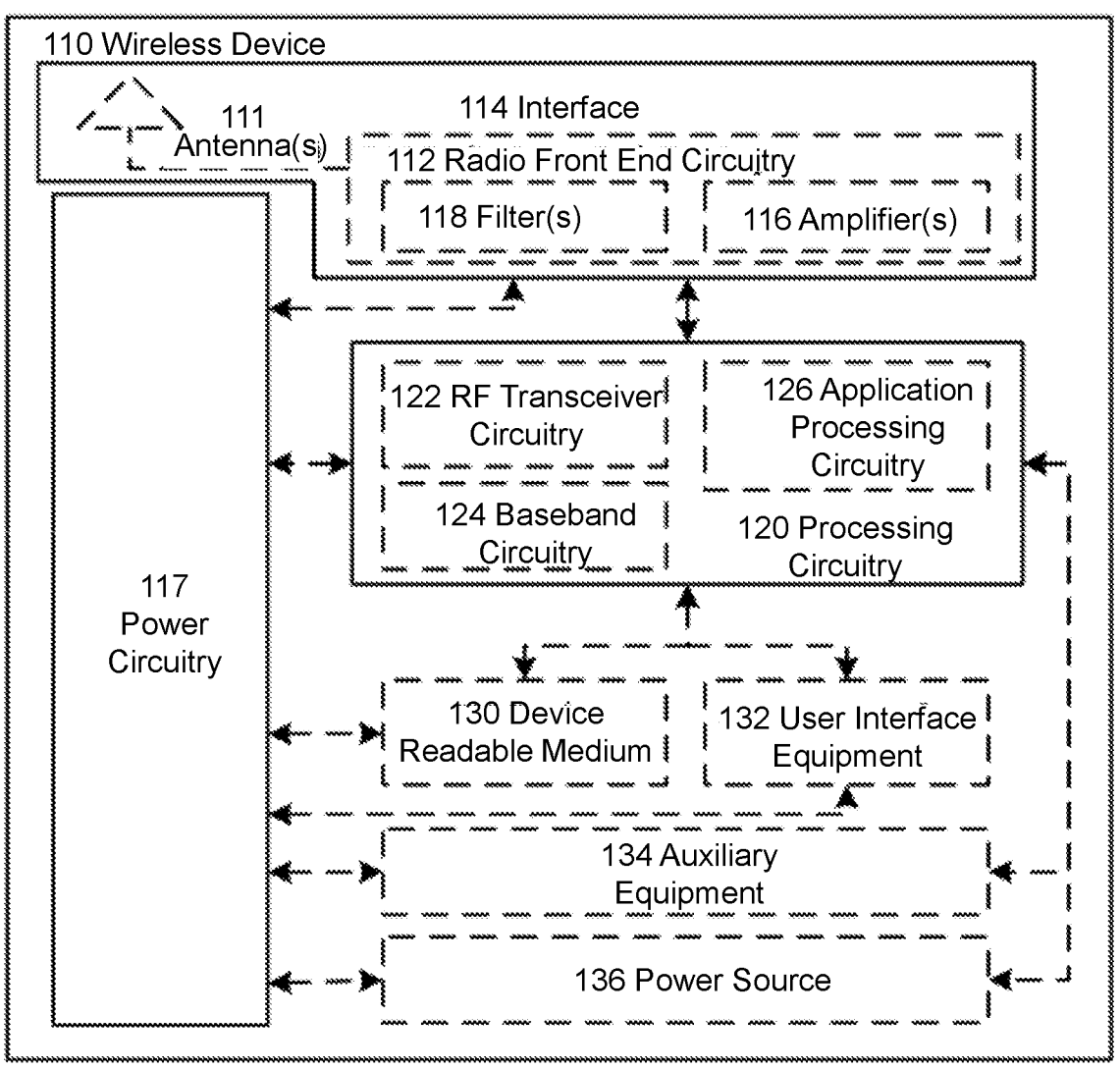
FIG. 6 illustrates an example wireless device, according to certain embodiments.

FIG. 6 illustrates an example wireless device 110. According to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 7:
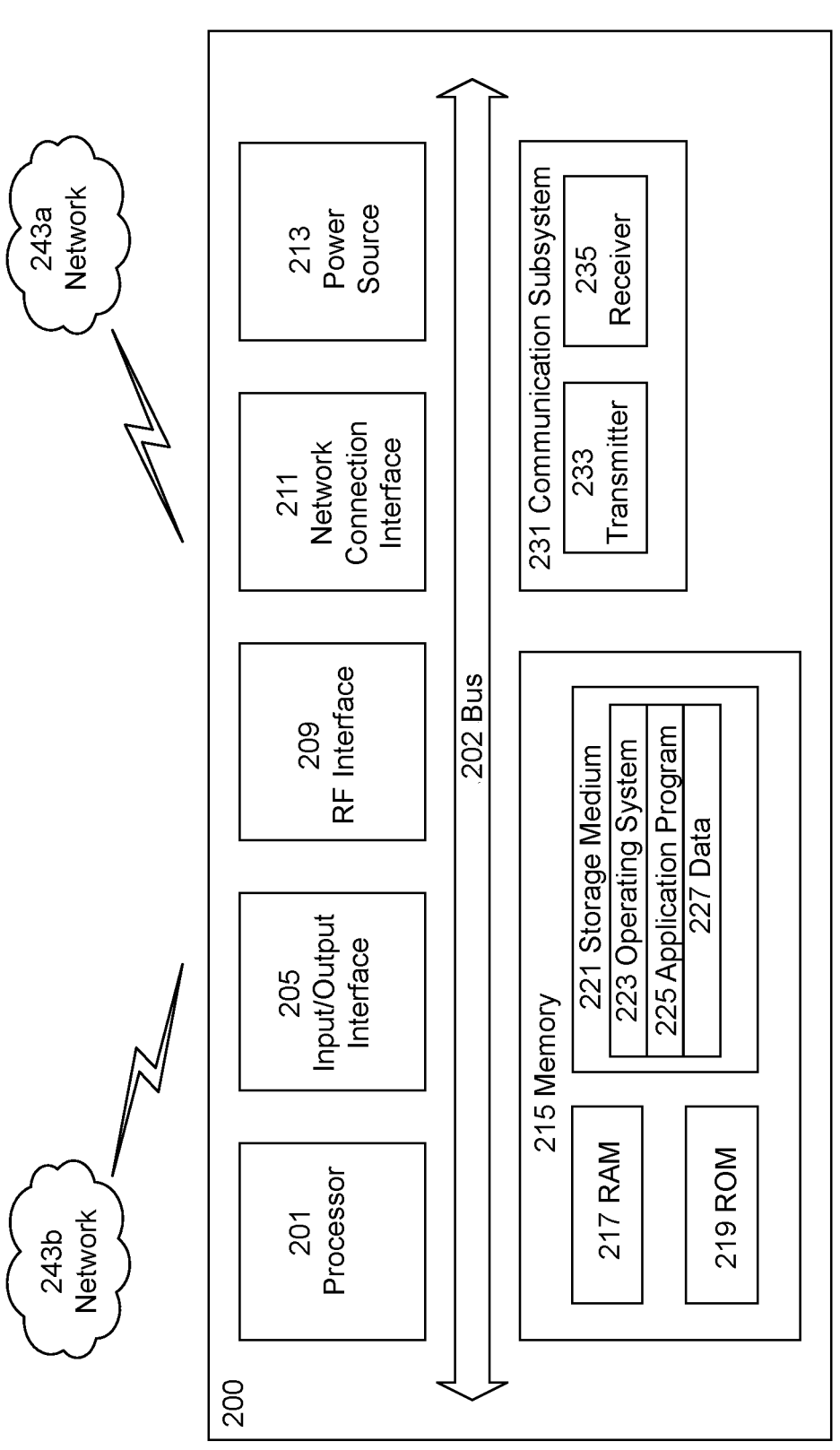
FIG. 7 illustrate an example user equipment, according to certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a wireless device configured for communication in accordance with one or more communication standards promulgated by the 3$^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 7 is a UE, the components discussed herein are equally applicable to a wireless device, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
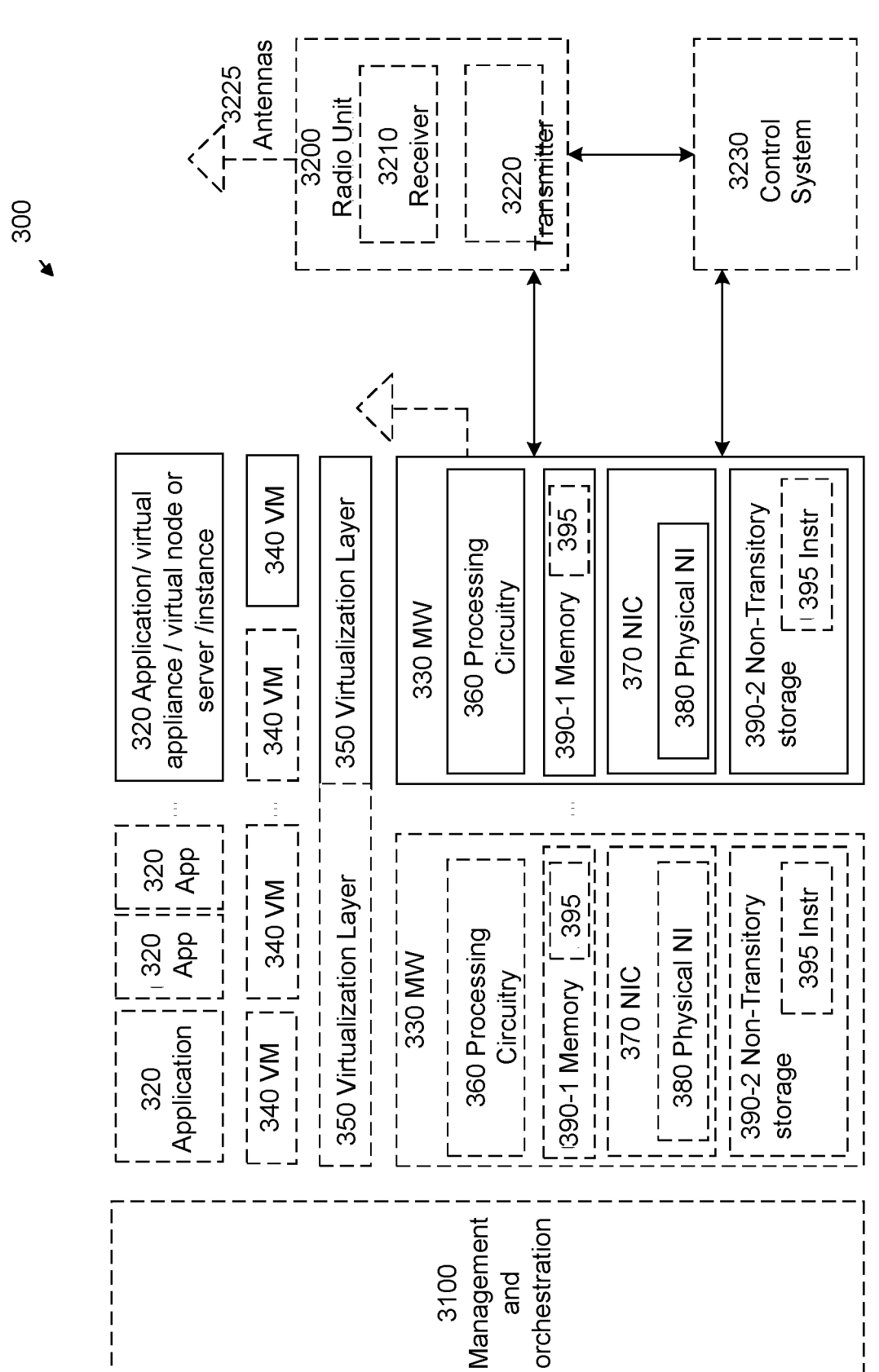
FIG. 8 illustrates a virtualization environment in which functions implemented by some embodiments may be virtualized, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be affected with the use of control system 3230 which may alternatively be used for communication between the hardware nodes 330 and radio units 3200.

Figure 9:
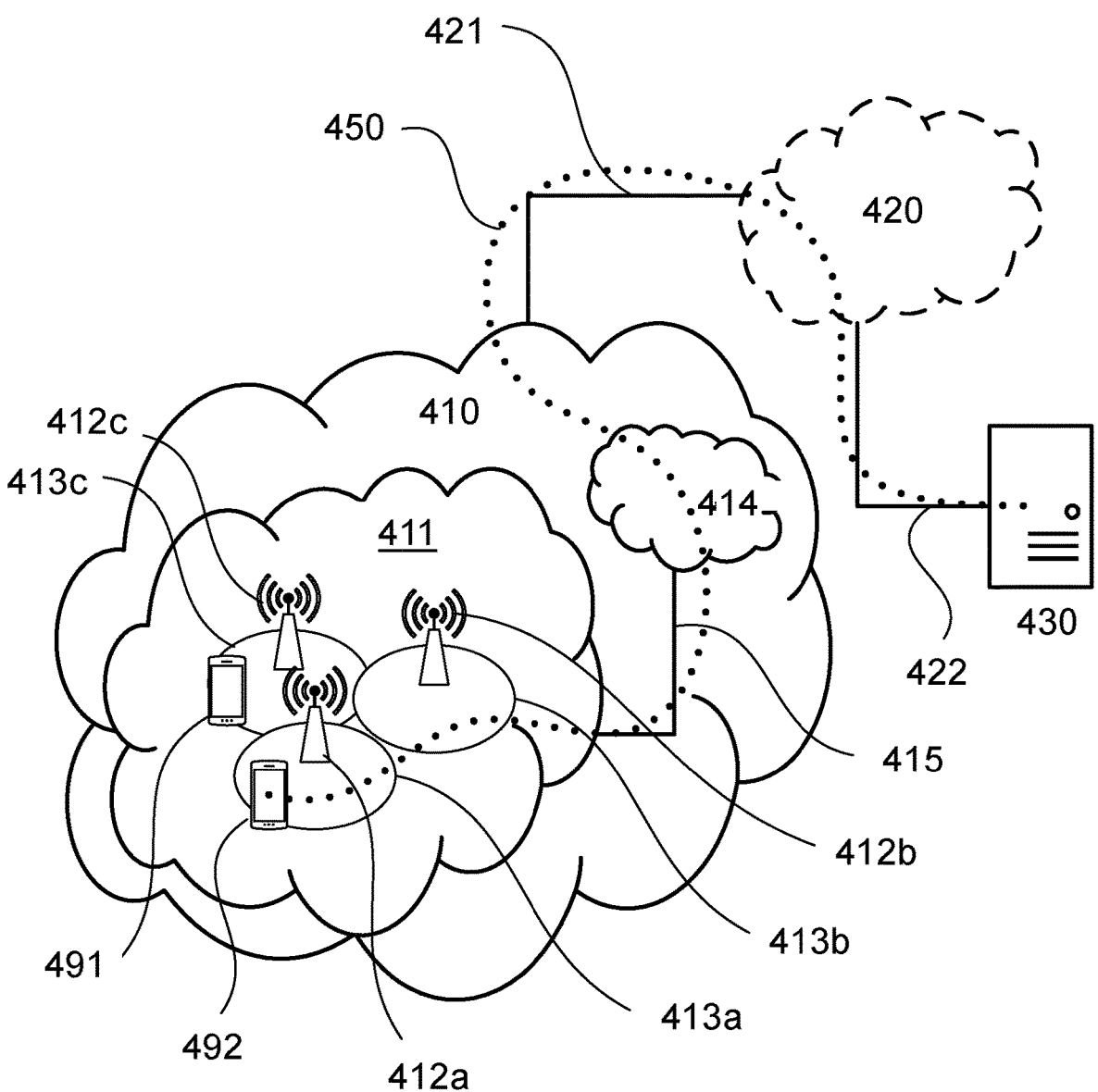
FIG. 9 illustrates a telecommunication network connected via an intermediate network to a host computer, according to certain embodiments.

FIG. 9 illustrates a telecommunication network connected via an intermediate network to a host computer in accordance with some embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
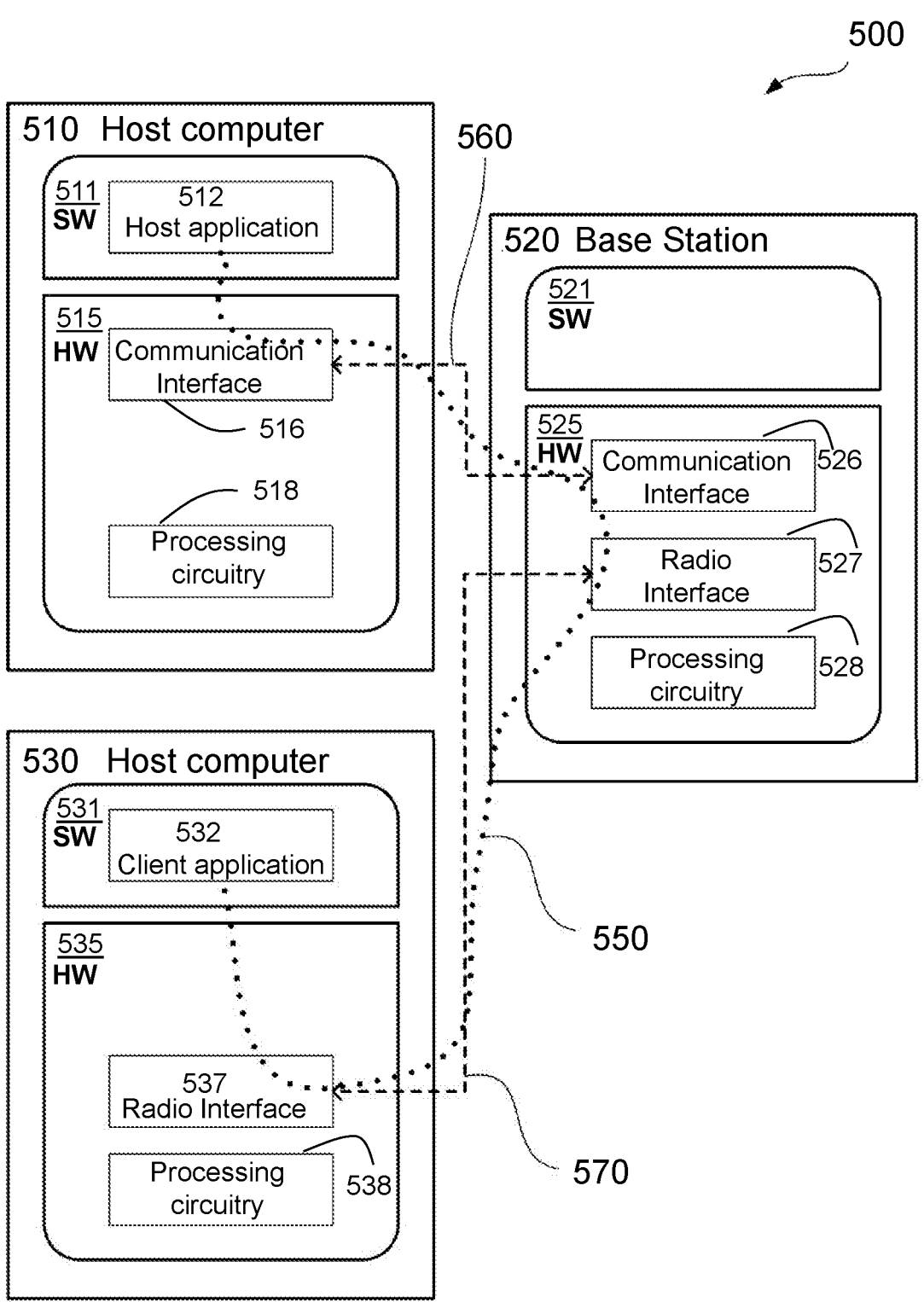
FIG. 10 illustrates a generalized block diagram of a host computer communicating via a base station with a user equipment over a partially wireless connection, according to certain embodiments.

FIG. 10 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412a, 412b, 412c and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 11, 12:
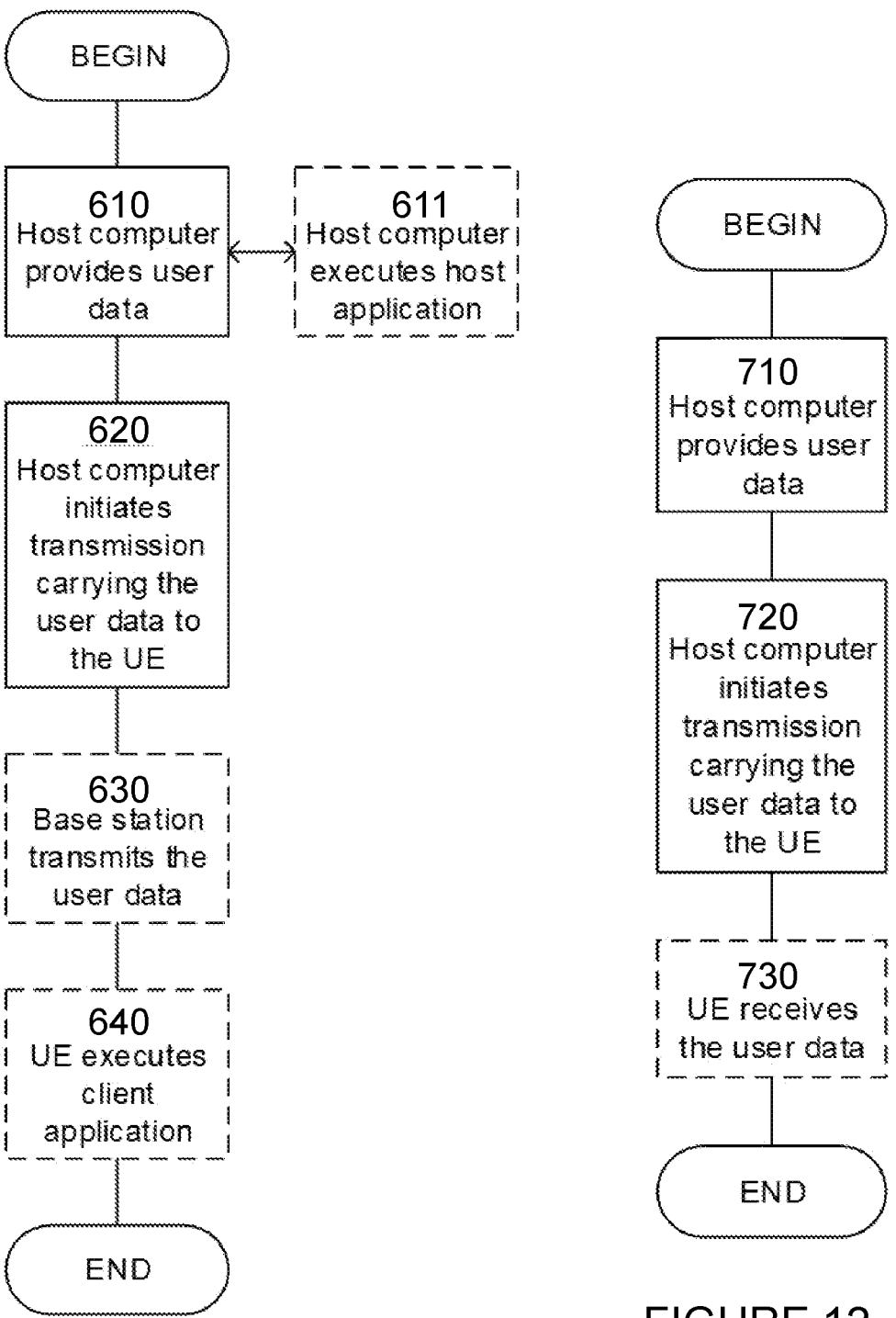
FIG. 11 illustrates a method implemented in a communication system, according to one embodiment.
FIG. 12 illustrates another method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 710 of the method, the host computer provides user data. In an optional substep (not shown) the host computer provides the user data by execut-ing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 13, 14:
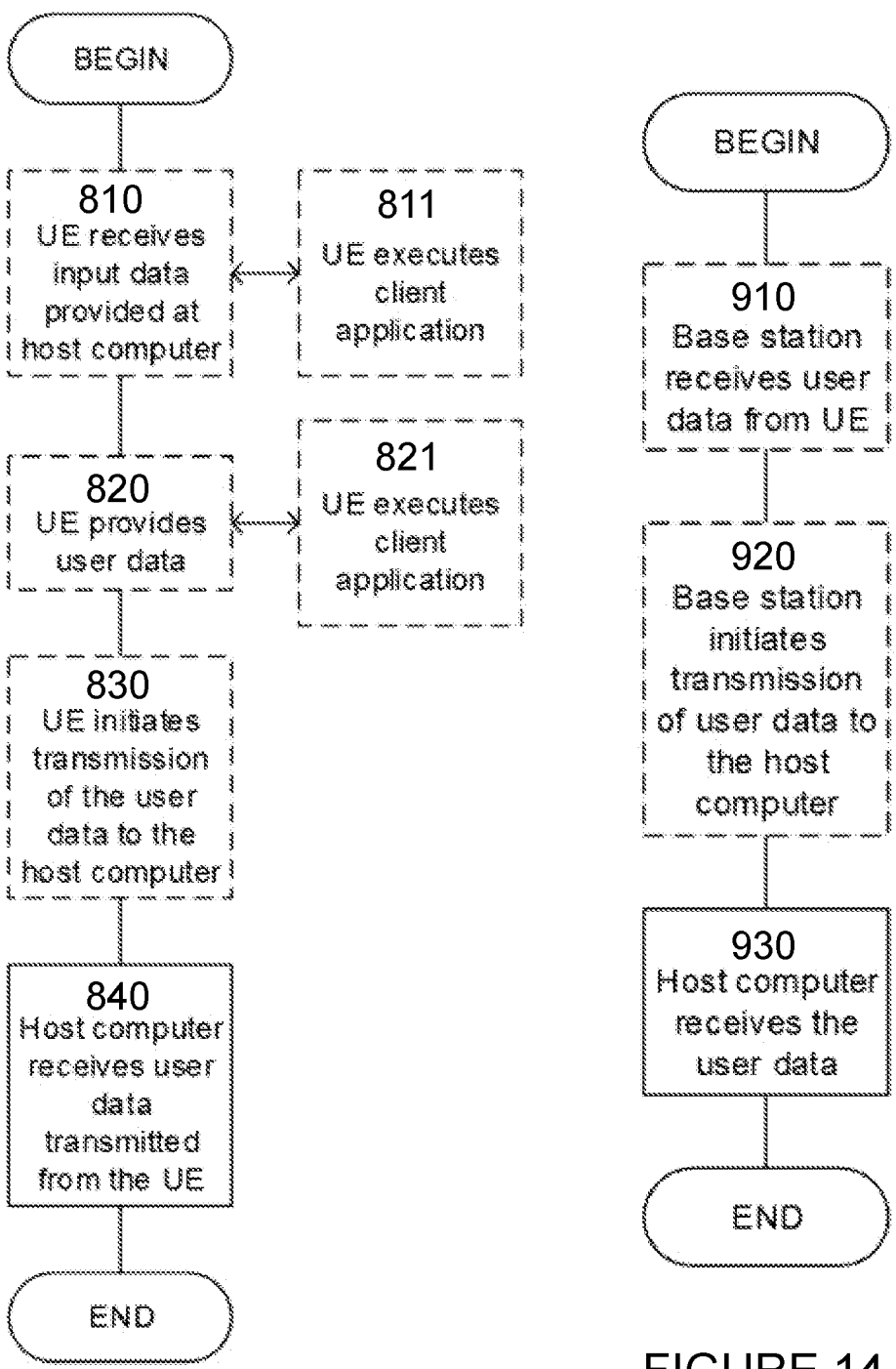
FIG. 13 illustrates another method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

FIG. 15 illustrates an exemplary method 1000 by a network node 160 operating as a DU, according to certain embodiments. The method 1000 begins at step 1002 with the network node 160 configuring a plurality of TRPs in a group of TRPs to transmit a plurality of signals in a multiplexed sequence to at least one wireless device 110. Each TRP in the group of TRPS is associated with a shared cell. At step 1004, the network node 160 receives, from the at least one wireless device 110, a response signal. Based on the response signal, the network node 160 determines at least one TRP from the group of TRPs for use in transmitting at least one additional signal to the at least one wireless device, at step 1006. As used herein, the term shared cell refers to a single shared cell, in particular embodiments.

In a particular embodiment, the network operating as the DU is a baseband unit (BBU). In a further particular embodiment, the network node is placed at a central location. In another embodiment, the network node is placed at a distributed location near the TRPs or at a location in between the TRPs and a central location.

In a particular embodiment, configuring the plurality of TRPs to transmit the plurality of signals in a multiplexed sequence includes configuring at least one TRP in the group of TRPs to transmit at least one CSI-RS, and the multiplexed sequence of the plurality of signals is a time, frequency, or code multiplexed sequence.

In a particular embodiment, configuring the plurality of TRPs to transmit the plurality of signals in a multiplexed sequence includes configuring at least one TRP in the group of TRPs to transmit at least one SSB, and the multiplexed sequence of the plurality of signals is a time multiplexed sequence.

In a further particular embodiment, the response signal is transmitted using a particular one of a plurality of PRACH resources, and the at least one TRP is determined for use in transmitting the at least one additional signal to the at least one wireless device based on the particular one of the plurality of PRACH resources. In a further particular embodiment, the method further includes transmitting, to each TRP in the group of TRPs, information identifying a respective one of the plurality of PRACH resources that is associated with that TRP in the group of TRPs. In a further particular embodiment, the group of TRPs includes a plurality of sub-groups of TRPs, and each sub-group of TRPs is associated with a unique Synchronization Signal Block, SSB, index.

In a particular embodiment, the response signal comprises measurement information, which includes a RSRP measurement for at least one of the plurality of signals transmitted in the multiplexed sequence from the plurality of TRPs in the group of TRPs, and the at least one TRP is determined for use in transmitting the at least one additional signal to the at least one wireless device based on the measurement information.

In a particular embodiment, the network node 160 stores a mapping of each TRP in the group of TRPs to a global beam identifier. Based on the mapping, the network node 160 determines the global beam identifier that is associated with the at least one TRP determined for use in transmitting the at least one additional signal to the at least one wireless device. In a further particular embodiment, the network node 160 translates the global beam identifier into a local beam identifier for use in in transmitting the at least one additional signal to the at least one wireless device.

In a further particular embodiment, the network node 160 transmits, the global beam identifier, to a network node operating as a fronthaul multiplexer for transmission to one or more of the plurality of TRPs and/or at least one of the plurality of TRPs.

In a particular embodiment, the network node 160 configures the at least one TRP to transmit the at least one additional signal to the at least one wireless device 110.

In a particular embodiment, the network node 160 configures the plurality of TRPs in the group of TRPs to perform non-coherent transmission when transmitting the plurality of signals in the multiplexed sequence to the at least one wireless device or when transmitting the at least one additional signal to the at least one wireless device.

In a particular embodiment, configuring the plurality of TRPs in the group of TRPs to transmit the plurality of signals in the multiplexed sequence to the at least one wireless device includes, for each TRP in the group of TRPs, assigning a selected one of a plurality of downlink physical signals for transmission to the at least one wireless device. In further particular embodiments, the downlink physical signals may include synchronization signals, which may include any one or more of SSBs, CSI-RS, primary signals, and/or secondary signals.

In a further particular embodiment, each TRP in the group of TRPs is configured to transmit a unique SB. In a further particular embodiment, multiple TRPs in the group of TRPs are configured to transmit a single SB.

In a particular embodiment, at least one TRP in the group of TRPs comprises an O-RU. In a further particular embodiment, the O-RU implements an O-RAN LLS split or a MAC-PHY split.

In a particular embodiment, the group of TRPs are activated via one or more information fields in a C-plane or U-plane, and the one or more information fields includes at least one of a bit mask, a list of TRP groups, or a list of beam identifiers with one for each TRP group.

In a particular embodiment, the plurality of TRPs in the group of TRPs are not co-located.

In certain embodiments, the method as described above may be performed by a computer networking virtual apparatus. FIG. 16 illustrates an example virtual apparatus 1100, according to certain embodiments. In certain embodiments, virtual apparatus 700 may include modules for performing steps similar to those described above with regard to the method illustrated and described in FIG. 15. For example, virtual apparatus 1100 may include a configuring unit 1102, a receiving unit 1104, a determining unit 1106, and any other suitable units or modules. In some embodiments, one or more of the modules may be implemented using processing circuitry 170 of FIG. 5. In certain embodiments, the functions of two or more of the various modules may be combined into a single module.

The configuring unit 1102 may perform the configuring functions of virtual apparatus 1100. For example, in a particular embodiment, configuring unit 1102 may configure a plurality of TRPs in a group of TRPs to transmit a plurality of signals in a multiplexed sequence to at least one wireless device 110. Each TRP in the group of TRPS is associated with a shared cell.

The receiving unit 1104 may perform the receiving functions of virtual apparatus 1100. For example, in a particular embodiment, receiving unit 1104 may receive, from the at least one wireless device 110, a response signal.

The determining unit 1106 may perform the determining functions of virtual apparatus 1100. For example, in a particular embodiment, based on the response signal, determining unit 1106 may determine at least one TRP from the group of TRPs for use in transmitting at least one additional signal to the at least one wireless device.

Other embodiments of virtual apparatus 1100 may include additional components beyond those shown in FIG. 16 that may be responsible for providing certain aspects of the network node's functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

FIG. 17 illustrates another exemplary method 1200 by a first network node 160, according to certain embodiments. The method 1200 begins at step 1202 with the network node 160 receiving a first message comprising a global beam identifier associated with a plurality of TRPs in a group of TRPs. At step 1204, the first network node 160 translates the global beam identifier associated with the group of TRPs into at least one local beam identifier associated with a particular one of the plurality of TRPs in the group of TRPs.

In a particular embodiment, the first network node 160 comprises one of the TRPs in the plurality of TRPs, and based on the at least one local beam identifier, the first network node 160 transmits at least one signal to a wireless device 110.

In a further particular embodiment, the first message is received from a second network node operating as a DU. In a further particular embodiment, the DU may include a BBU operating at a centralized location, a distributed location, or at a location between a centralized location and the group of TRPs.

In a particular embodiment, prior to receiving the first message from the second network node, the first network node 160 receives, from a second network node operating as a DU, a control plane message comprising a global beam identifier for transmitting at least one signal. The first network node 160 translates the global beam identifier to a local beam identifier. Based on the local beam identifier, the first network node 160 transmits the at least one signal to at least one wireless device 110. The at least one signal is transmitted in a multiplexed sequence with at least one other signal transmitted by at least one other TRP in the group of TRPs.

In a further particular embodiment, the first network node is operating as a fronthaul multiplexer, FHM, for the plurality of TRPs in the group of TRPs, and after translation of the global beam identifier into the at least one local beam identifier, the first network node 160 transmits the at least one local beam identifier to the particular one of the plurality of TRPs in the group of TRPs.

In a particular embodiment, the first message comprises a control plane message.

In a particular embodiment, the first message comprises a bitmask comprising a plurality of positions, and each position in the bitmask is associated with a respective one of a plurality of groups of TRPs.

In a particular embodiment, the first network node 160 configures each group of TRPs to monitor a particular one of the plurality of positions in the bitmask.

In certain embodiments, the method as described above may be performed by a computer networking virtual apparatus. FIG. 18 illustrates an example virtual apparatus 1300, according to certain embodiments. In certain embodiments, virtual apparatus 1300 may include modules for performing steps similar to those described above with regard to the method illustrated and described in FIG. 17. For example, virtual apparatus 1300 may include a receiving unit 1302, a translating unit 1304, and any other suitable units or modules. In some embodiments, one or more of the modules may be implemented using processing circuitry 170 of FIG. 5. In certain embodiments, the functions of two or more of the various modules may be combined into a single module.

The receiving unit 1302 may perform the receiving functions of virtual apparatus 1300. For example, in a particular embodiment, receiving unit 1302 may receive a first message comprising a global beam identifier associated with a plurality of TRPs in a group of TRPs.

The translating unit 1104 may perform the translating functions of virtual apparatus 1300. For example, in a particular embodiment, translating unit 1304 may translate the global beam identifier associated with the group of TRPs into at least one local beam identifier associated with a particular one of the plurality of TRPs in the group of TRPs.

Other embodiments of virtual apparatus 1300 may include additional components beyond those shown in FIG. 18 that may be responsible for providing certain aspects of the network node's functionality, including any of the functionality described above and/or any additional functionality (including any functionality necessary to support the solutions described above). The various different types of network nodes 115 may include components having the same physical hardware but configured (e.g., via programming) to support different radio access technologies, or may represent partly or entirely different physical components.

EXAMPLE EMBODIMENTS

Group A Embodiments

Example Embodiment 1. A method performed by a wireless device, the method comprising: receiving, from a network node, information identifying, for each Transmit/Receive Point (TRP) in a group of TRPs, a respective one of a plurality of Physical Random Access Channel (PRACH) resources; receiving a plurality of signals transmitted in a time-multiplexed sequence from the group of TRPs; based on the plurality of signals, selecting at least one TRP from the group of TRPs; based on the information, determining a PRACH resource from the plurality of PRACH resources that is associated with the selected at least one TRP; and transmitting a response signal associated with the determined PRACH resource.

Example Embodiment 2. The method of Example Embodiment 1, wherein the information identifies an association between each TRP in the group of TRPs with the group of TRPs.

Example Embodiment 3. The method of any one of Example Embodiments 1 to 2, wherein each of the received signals is received in a SB that is uniquely associated with a TRP within the group of TRPs.

Example Embodiment 4. The method of any one of Example Embodiments 1 to 3, wherein at least two of the plurality of signals are received in a single SB.

Example Embodiment 5. The method of any one of Example Embodiments 1 to 4, wherein the group of TRPs comprises a plurality of sub-groups of TRPs, and wherein each sub-group of TRPs is associated with unique PRACH resource of the plurality of PRACH resources.

Example Embodiment 6. The method of any one of Example Embodiments 1 to 5, wherein at least one TRP in the group of TRPs comprises an O-RAN Radio Unit (O-RU).

Example Embodiment 7. The method of Example Embodiment 6, wherein the O-RU implements the O-RAN LLS ("option 7-2x") or a CPRI split ("option 8").

Example Embodiment 8. The method of Example Embodiment 6, wherein the O-RU implements the O-RAN LLS or an "option 6" (MAC-PHY) split.

Example Embodiment 9. The method of any one of Example Embodiments 1 to 8, wherein the time-multiplexed sequence is applied on a slot, an Orthogonal Frequency Division Multiplexing (OFDM) symbol, a Physical Resource Block (PRB), and/or a Resource Element (RE) level for a spatial stream.

Example Embodiment 10. The method of any one of Example Embodiments 1 to 9, wherein at least one of: a beam weight is assigned to each TRP in the group of TRPs; distributed beamforming (coherent combining) is used in uplink and downlink; and distributed Multiple Input-Multiple Output (MIMO) is supported.

Example Embodiment 11. The method of any one of Example Embodiments 1 to 10, wherein each signal transmitted by the group of TRPs is associated with a beam identifier.

Example Embodiment 12. A computer program comprising instructions which when executed on a computer perform any of the methods of Example Embodiments 1 to 11.

Example Embodiment 13. A computer program product comprising computer program, the computer program comprising instructions which when executed on a computer perform any of the methods of Example Embodiments 1 to 11.

Example Embodiment 14. A non-transitory computer readable medium storing instructions which when executed by a computer perform any of the methods of Example Embodiments 1 to 11.

Example Embodiment 15. A wireless device comprising: processing circuitry configured to perform any of the methods of Example Embodiments 1 to 11.

Group B Embodiments

Example Embodiment 16. A method performed by a network node, the method comprising: transmitting, to at least one wireless device, information identifying, for each Transmit/Receive Point (TRP) in a group of TRPs, a respective one of a plurality of Physical Random Access Channel (PRACH) resources; configuring each TRP in the group of TRPs to transmit at least one signal in a time-multiplexed sequence to the at least one wireless device; receiving, from the at least one wireless device, a response signal associated with a particular one of the plurality of PRACH resources; and based on the particular one of the plurality of PRACH resources, determining a TRP from the group of TRPs selected by the at least one wireless device.

Example Embodiment 17. The method of Example Embodiment 16, further comprising transmitting, to each TRP in the group of TRPs, the information identifying the respective one of the plurality of PRACH resources that is associated with each TRP in the group of TRPs.

Example Embodiment 18. The method of any one of Example Embodiments 16 to 17, wherein the information identifies an association between each TRP in the group of TRPs with the group of TRPs.

Example Embodiment 19. The method of any one of Example Embodiments 16 to 18, wherein configuring each TRP in the group of TRPs to transmit at least one signal in the time-multiplexed sequence to the at least one wireless device comprises: for each TRP in the group of TRPs, assigning a selected one of a plurality of signal blocks for transmission to the at least one wireless device.

Example Embodiment 20. The method of any one of Example Embodiments 16 to 19, wherein each TRP in the group of TRPs is configured to transmit in a unique SB.

Example Embodiment 21. The method of any one of Example Embodiments 16 to 19, wherein a plurality of TRPs in the group of TRPs are configured to transmit in a single SB.

Example Embodiment 22. The method of any one of Example Embodiments 16 to 21, wherein the group of TRPs comprises a plurality of sub-groups of TRPs, and wherein each sub-group of TRPs is associated with unique PRACH resource of the plurality of PRACH resources.

Example Embodiment 23. The method of any one of Example Embodiments 16 to 22, wherein at least one TRP in the group of TRPs comprises an O-RAN Radio Unit (O-RU).

Example Embodiment 24. The method of Example Embodiment 23, wherein the O-RU implements the O-RAN LLS ("option 7-2x") or a CPRI split ("option 8").

Example Embodiment 25. The method of Example Embodiment 23, wherein the O-RU implements the O-RAN LLS or an "option 6" (MAC-PHY) split.

Example Embodiment 26. The method of any one of Example Embodiments 16 to 25, wherein the time-multiplexed sequence is applied on a slot, an Orthogonal Frequency Division Multiplexing (OFDM) symbol, a Physical Resource Block (PRB), and/or a Resource Element (RE) level for a spatial stream.

Example Embodiment 27. The method of any one of Example Embodiments 16 to 26, wherein configuring each TRP in the group of TRPs to transmit the at least one signal in the time-multiplexed sequence to the at least one wireless device comprises at least one of: assigning a beam weight to each TRP in the group of TRPs; using distributed beamforming (coherent combining) in uplink and downlink; and supporting distributed Multiple Input-Multiple Output (MIMO).

Example Embodiment 28. The method of any one of Example Embodiments 16 to 27, further comprising transmitting a signal to at least one TRP in the group of TRPs to activate the TRP.

Example Embodiment 29. The method of any one of Example Embodiments 16 to 28, wherein configuring each TRP in the group of TRPs to transmit the at least one signal in the time-multiplexed sequence to the at least one wireless device comprises assigning each TRP a different beam weight for signal to be transmitted to the wireless device.

Example Embodiment 30. The method of any one of Example Embodiments 16 to 29, wherein each signal transmitted by the group of TRPs is associated with a beam identifier.

Example Embodiment 31. The method of Example Embodiment 30, wherein signaling of which TRPs to activate is implemented by translation of beam identifiers, and wherein the translation can be implemented in each TRP, or by an external node such as an FHM, or by a programmable packet switch or router.

Example Embodiment 32. The method of any one of Example Embodiments 16 to 31, wherein the group of TRPs share a cell, and wherein an O-RAN Distributed Unit (O-DU) implements shared-cell functionality, and wherein each TRP is signaled by the O-DU using a unique address addressing of TRPs.

Example Embodiment 33. The method of Example Embodiment 32, wherein the O-DU signals the group of TRPs using at least one of Ethernet MAC addressing or IP addressing like for M-plane messages.

Example Embodiment 34. The method of any one of Example Embodiments 16 to 31, wherein the group of TRPs are activated via one or more information fields in a C-plane or U-plane.

Example Embodiment 35. The method of Example Embodiment 34, wherein the one or more information fields comprises at least one of a bit mask, a list of TRP groups, or a list of beam IDs with one for each TRP group.

Example Embodiment 36. The method of Example Embodiment 35, wherein each TRP in the group of TRPs is informed via M-plane how to interpret the one or more information fields.

Example Embodiment 37. A computer program comprising instructions which when executed on a computer perform any of the methods of Example Embodiments 16 to 36.

Example Embodiment 38. A computer program product comprising computer program, the computer program comprising instructions which when executed on a computer perform any of the methods of Example Embodiments 16 to 36.

Example Embodiment 39. A non-transitory computer readable medium storing instructions which when executed by a computer perform any of the methods of Example Embodiments 16 to 36.

Example Embodiment 40. A network node comprising: processing circuitry configured to perform any of the methods of Example Embodiments 16 to 36.

Group C Embodiments

Example Embodiment 41. A wireless device for improving network efficiency, the wireless device comprising: processing circuitry configured to perform any of the steps of any of the Group A embodiments; and power supply circuitry configured to supply power to the wireless device.

Example Embodiment 42. A base station for improving network efficiency, the base station comprising: processing circuitry configured to perform any of the steps of any of the Group B Embodiments; power supply circuitry configured to supply power to the wireless device.

Example Embodiment 43. A user equipment (UE) for improving network efficiency, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 44. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Example Embodiment 45. The communication system of the previous embodiment further including the base station.

Example Embodiment 46. The communication system of the previous 2 embodiments, further including the UE, wherein the UE is configured to communicate with the base station.

Example Embodiment 47. The communication system of the previous 3 embodiments, wherein: the processing circuitry of the host computer is configured to execute a host application, thereby providing the user data; and the UE comprises processing circuitry configured to execute a client application associated with the host application.

Example Embodiment 48. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

Example Embodiment 49. The method of the previous embodiment, further comprising, at the base station, transmitting the user data.

Example Embodiment 50. The method of the previous 2 embodiments, wherein the user data is provided at the host computer by executing a host application, the method further comprising, at the UE, executing a client application associated with the host application.

Example Embodiment 51. A user equipment (UE) configured to communicate with a base station, the UE comprising a radio interface and processing circuitry configured to performs the of the previous 3 embodiments.

Example Embodiment 52. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Example Embodiment 53. The communication system of the previous embodiment, wherein the cellular network further includes a base station configured to communicate with the UE.

Example Embodiment 54. The communication system of the previous 2 embodiments, wherein: the processing circuitry of the host computer is configured to execute a host application, thereby providing the user data; and the UE's processing circuitry is configured to execute a client application associated with the host application.

Example Embodiment 55. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Example Embodiment 56. The method of the previous embodiment, further comprising at the UE, receiving the user data from the base station.

Example Embodiment 57. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Example Embodiment 58. The communication system of the previous embodiment, further including the UE.

Example Embodiment 59. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 60. The communication system of the previous 3 embodiments, wherein: the processing circuitry of the host computer is configured to execute a host application; and the UE's processing circuitry is configured to execute a client application associated with the host application, thereby providing the user data.

Example Embodiment 61. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 62. A method implemented in a communication system including a host computer, a base station and a user equipment (UE), the method comprising: at the host computer, receiving user data transmitted to the base station from the UE, wherein the UE performs any of the steps of any of the Group A embodiments.

Example Embodiment 63. The method of the previous embodiment, further comprising, at the UE, providing the user data to the base station.

Example Embodiment 64. The method of the previous 2 embodiments, further comprising: at the UE, executing a client application, thereby providing the user data to be transmitted; and at the host computer, executing a host application associated with the client application.

Example Embodiment 65. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 66. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Example Embodiment 67. The communication system of the previous embodiment further including the base station.

Example Embodiment 68. The communication system of the previous 2 embodiments, further including the UE, wherein the UE is configured to communicate with the base station.

Example Embodiment 69. The communication system of the previous 3 embodiments, wherein: the processing circuitry of the host computer is configured to execute a host application; the UE is configured to execute a client application associated with the host application, thereby providing the user data to be received by the host computer.

Example Embodiment 70. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

Example Embodiment 71. The method of the previous embodiment, further comprising at the base station, receiving the user data from the UE.

Example Embodiment 72. The method of the previous 2 embodiments, further comprising at the base station, initiating a transmission of the received user data to the host computer.

Modifications, additions, or omissions may be made to the systems and apparatuses described herein without departing from the scope of the disclosure. The components of the systems and apparatuses may be integrated or separated.

Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

The invention claimed is:

1. A method performed by a first network node operating as an Open-Radio Access Network, O-RAN, Distributed Unit, DU, the method comprising:
   configuring a plurality of Transmit/Receive Points, TRPs, in a group of TRPs to transmit a plurality of signals in a multiplexed sequence to at least one wireless device, each TRP in the group of TRPS being associated with a shared cell, and wherein each TRP in the group of TRPs is associated with a global beam identifier;
   receiving, from the at least one wireless device, a response signal;
   based on the response signal, determining at least one TRP from the group of TRPs for use in transmitting at least one additional signal to the at least one wireless device;
   translating the global beam identifier into a local beam identifier for use in transmitting, by the at least one determined TRP, the at least one additional signal to the at least one wireless device; and
   transmitting, to a second network node operating as a fronthaul multiplexer, the global beam identifier for transmission to the at least one determined TRP.

2. The method of claim 1, wherein configuring the plurality of TRPs to transmit the plurality of signals in a multiplexed sequence comprises:
   configuring at least one TRP in the group of TRPs to transmit at least one Channel State Information-Reference Signal, CSI-RS, and
   wherein the multiplexed sequence of the plurality of signals is a time, frequency, or code multiplexed sequence.

3. The method of claim 1, wherein configuring the plurality of TRPs to transmit the plurality of signals in a multiplexed sequence comprises:
   configuring at least one TRP in the group of TRPs to transmit at least one Signal Block, SSB, and
   wherein the multiplexed sequence of the plurality of signals is a time multiplexed sequence.

4. The method of claim 3, wherein:
   the response signal is transmitted using a particular one of a plurality of Physical Random Access Channel, PRACH, resources, and
   the at least one TRP is determined for use in transmitting the at least one additional signal to the at least one wireless device based on the particular one of the plurality of PRACH resources.

5. The method of claim 4, further comprising transmitting, to each TRP in the group of TRPs, information identifying a respective one of the plurality of PRACH resources that is associated with that TRP in the group of TRPs.

6. The method of claim 4, wherein the group of TRPs comprises a plurality of sub-groups of TRPs, and wherein each sub-group of TRPs is associated with a unique Synchronization Signal Block, SSB, index.

7. The method of claim 1, wherein:

the response signal comprises measurement information, the measurement information comprises a Reference Signal Received Power, RSRP, measurement for at least one of the plurality of signals transmitted in the multiplexed sequence from the plurality of TRPs in the group of TRPs, and the at least one TRP is determined for use in transmitting the at least one additional signal to the at least one wireless device based on the measurement information.

8. The method of claim 1, further comprising:

storing a mapping of each TRP in the group of TRPs to the global beam identifier; and based on the mapping, determining the global beam identifier that is associated with the at least one TRP determined for use in transmitting the at least one additional signal to the at least one wireless device.

9. The method of claim 1, further comprising configuring the at least one TRP to transmit the at least one additional signal to the at least one wireless device.

10. The method of claim 1, further comprising configuring the plurality of TRPs in the group of TRPs to perform non-coherent transmission when transmitting the plurality of signals in the multiplexed sequence to the at least one wireless device or when transmitting the at least one additional signal to the at least one wireless device.

11. The method of claim 1, wherein configuring the plurality of TRPs in the group of TRPs to transmit the plurality of signals in the multiplexed sequence to the at least one wireless device comprises:

for each TRP in the group of TRPs, assigning a selected one of a plurality of downlink physical signals for transmission to the at least one wireless device.

12. The method of claim 11, wherein each TRP in the group of TRPs is configured to transmit a unique Synchronization Signal Block Index, SB.

13. The method of claim 11, wherein multiple TRPs in the group of TRPs are configured to transmit a single Synchronization Signal Block Index, SB.

14. The method of claim 1, wherein at least one TRP in the group of TRPs comprises an Open-Radio Access Network-Radio Unit, O-RU.

15. The method of claim 14, wherein the O-RU implements an Open-Radio Access Network Lower Layer Split, O-RAN LLS; or a Medium Access Control-Physical, MAC-PHY, split.

16. The method of claim 1, wherein the group of TRPs are activated via one or more information fields in a Control-plane, C-plane, or User-plane, U-plane, wherein the one or more information fields comprises at least one of a bit mask, a list of TRP groups, or a list of beam identifiers with one for each TRP group.

17. The method of claim 1, wherein the plurality of TRPs in the group of TRPs are not co-located.

18. A network node operating as a Distributed Unit, DU, the network node comprising processing circuitry configured to perform the method of claim 1.

19. A method performed by a first network node, the method comprising:

receiving, from a second network node operating as a distributed unit, DU, a first message comprising a global beam identifier associated with a plurality of Transmit/Receive Points, TRPs, in a group of TRPs, wherein the first network node is operating as a fronthaul multiplexer, FHM, for the plurality of TRPs in the group of TRPs;

translating the global beam identifier associated with the group of TRPs into at least one local beam identifier associated with a particular one of the plurality of TRPs in the group of TRPs; and after translation of the global beam identifier into the at least one local beam identifier, transmitting the at least one local beam identifier to the particular one of the plurality of TRPs in the group of TRPs, wherein the DU is an Open-Radio Access Network, O-RAN, DU and the particular one of the plurality of TRPs is an O-RAN Radio Unit, O-RU, and wherein a management plane, M-plane, configuration is defined describing the translation between the global beam identifier received from the O-RAN DU and the at least one local beam identifier supported by the O-RAN O-RU.

20. The method of claim 19, wherein the first network node comprises one of the TRPs in the plurality of TRPs, and the method further comprises, based on the at least one local beam identifier, transmitting at least one signal to a wireless device.

21. The method of claim 19, wherein the first message comprises a control plane message.

22. The method of claim 19, wherein the first message comprises a bitmask comprising a plurality of positions, where each position in the bitmask is associated with a respective one of a plurality of groups of TRPs.

23. The method of any one of claim 22, further comprising configuring each group of TRPs to monitor a particular one of the plurality of positions in the bitmask.

24. A first network node comprising processing circuitry configured to perform the method of claim 19.

* * * * *